(12) United States Patent
Steffanson et al.

(10) Patent No.: US 11,657,605 B2
(45) Date of Patent: *May 23, 2023

(54) USER INTERFACES TO CONFIGURE A THERMAL IMAGING SYSTEM

(71) Applicant: MP High Tech Solutions Pty Ltd, Eveleigh (AU)

(72) Inventors: Marek Steffanson, Mosman (AU); Felix Dintner, Bronte (AU)

(73) Assignee: Calumino Pty Ltd., Eveleigh (AU)

( * ) Notice: Subject to any disclaimer, the term of this patent is extended or adjusted under 35 U.S.C. 154(b) by 234 days.

This patent is subject to a terminal disclaimer.

(21) Appl. No.: 16/900,741

(22) Filed: Jun. 12, 2020

(65) Prior Publication Data

US 2020/0314358 A1    Oct. 1, 2020

Related U.S. Application Data

(63) Continuation of application No. 16/290,367, filed on Mar. 1, 2019, now Pat. No. 10,701,290, which is a
(Continued)

(51) Int. Cl.
*H04N 5/33*       (2023.01)
*G08B 21/04*      (2006.01)
(Continued)

(52) U.S. Cl.
CPC .............. *H04N 5/33* (2013.01); *G06F 18/40* (2023.01); *G06N 20/00* (2019.01); *G06V 10/22* (2022.01);
(Continued)

(58) Field of Classification Search
CPC ........ H04N 5/33; G06K 9/6253; G06N 20/00; G06N 3/08; G06V 10/22; G06V 20/52;
(Continued)

(56) References Cited

U.S. PATENT DOCUMENTS 7,693,679 B1    4/2010   Warnke et al.
3,003,941 A1    8/2011   Heinke et al.
(Continued)

OTHER PUBLICATIONS

Sixsmith, et al. "A Smart Sensor to Detect the Falls of the Elderly." IEEE Pervasive Computing, IEEE Service Center, Apr. 1, 2004.
(Continued)

*Primary Examiner* — Curtis J King
(74) *Attorney, Agent, or Firm* — Greenberg Traurig

(57) ABSTRACT

A thermal imaging system including at least one thermal imaging device, a server, and at least one mobile device. The thermal imaging device captures thermal images of an environment. The server applies computer vision techniques to the thermal images, detects events of a predetermined type, and generates notifications of the events of predetermined types detected from the thermal images. The mobile device runs a mobile application that is configured to receive the notifications, present user interfaces, receive user annotations of the notifications in the user interfaces, and transmit the annotations to the server. According to the annotations, the server adjusts parameters used in the application of the computer vision techniques and in the generation of the notifications.

19 Claims, 18 Drawing Sheets

Related U.S. Application Data continuation of application No. 16/042,045, filed on Jul. 23, 2018, now Pat. No. 10,225,492.

(51) Int. Cl.
*G06N 20/00* (2019.01)
*G06V 10/22* (2022.01)
*G06V 20/52* (2022.01)
*G06F 18/40* (2023.01)
*G06N 3/08* (2023.01)

(52) U.S. Cl.
CPC ........... *G06V 20/52* (2022.01); *G08B 21/043* (2013.01); *G08B 21/0407* (2013.01); *G08B 21/0469* (2013.01); *G08B 21/0476* (2013.01); *G06N 3/08* (2013.01)

(58) Field of Classification Search
CPC .............. G08B 21/0407; G08B 21/043; G08B 21/0469; G08B 21/0476
See application file for complete search history.

(56) References Cited

U.S. PATENT DOCUMENTS

| | | | |
|---|---|---|---|
| 9,141,851 B2 | 9/2015 | Sarkis et al. | |
| 9,408,561 B2 | 8/2016 | Stone et al. | |
| 9,489,635 B1 | 11/2016 | Zhu | |
| 9,863,660 B2 | 1/2018 | Kusukame et al. | |
| 10,225,492 B1 | 3/2019 | Steffanson et al. | |
| 10,489,661 B1* | 11/2019 | Rush | G06K 9/6288 |
| 10,701,290 B2 | 6/2020 | Steffanson et al. | |
| 2007/0049259 A1 | 3/2007 | Onishi et al. | |
| 2010/0194525 A1* | 8/2010 | Do | G08B 21/043 340/5.1 |
| 2010/0214408 A1 | 8/2010 | McClure et al. | |
| 2011/0043630 A1* | 2/2011 | McClure | G08B 13/19602 348/143 |
| 2011/0295583 A1 | 12/2011 | Hollock et al. | |
| 2012/0075309 A1 | 3/2012 | Warnke et al. | |
| 2012/0314901 A1* | 12/2012 | Hanson | G06T 7/73 600/595 |
| 2013/0072120 A1 | 3/2013 | Wu | |
| 2013/0321637 A1 | 12/2013 | Frank et al. | |
| 2015/0036920 A1 | 2/2015 | Wu et al. | |
| 2015/0247647 A1* | 9/2015 | Kusukame | G06V 40/10 700/299 |
| 2016/0140827 A1* | 5/2016 | Derenne | A61B 5/6892 340/573.7 |
| 2016/0188965 A1* | 6/2016 | McClure | G06K 9/627 382/103 |
| 2016/0224839 A1* | 8/2016 | Dempsey | G08B 21/0476 |
| 2018/0109703 A1 | 4/2018 | Steffanson et al. | |
| 2019/0130725 A1* | 5/2019 | Dempsey | G08B 19/00 |
| 2020/0029029 A1 | 1/2020 | Steffanson et al. | |
| 2021/0216774 A1 | 7/2021 | Jiang et al. | |
| 2021/0350687 A1* | 11/2021 | Johnson | G06V 20/52 |
| 2022/0076028 A1 | 3/2022 | Hisada et al. | |

OTHER PUBLICATIONS

Supplementary European Search Report, EP 19840915.3, dated Mar. 18, 2022.
International Search Report and Written Opinion, PCT/US19/20261, dated Jun. 6, 2019.

* cited by examiner

USER INTERFACES TO CONFIGURE A THERMAL IMAGING SYSTEM

RELATED APPLICATIONS

The present application is a continuation application of U.S. patent application Ser. No. 16/290,367, filed Mar. 1, 2019, which is a continuation application of U.S. patent application Ser. No. 16/042,045, filed Jul. 23, 2018, issued as U.S. Pat. No. 10,225,492 on Mar. 5, 2019, both entitled "User Interfaces to Configure a Thermal Imaging System," the entire disclosures of which applications are hereby incorporated herein by reference.

The present application relates to U.S. patent application Ser. No. 15/607,345, filed May 26, 2017, and U.S. patent application Ser. Nos. 15/797,693 and 15/797,999, both filed Oct. 30, 2017, the entire disclosures of which applications are hereby incorporated herein by reference.

FIELD OF THE TECHNOLOGY

At least some embodiments disclosed herein relate to a thermal imaging system in general and more particularly but not limited to user interfaces for the configuration of the thermal imaging system to detect predetermined types of events.

BACKGROUND

Thermal imaging can be used for human detection, due to a high contrast of the elevated human body temperature compared to the temperatures of a typical indoor environment. Thermal imaging with low resolution can be used for detecting humans reliably within a typical room area. The advantages of low resolution thermal imaging compared to conventional video monitoring using lights visible to human eyes include not only the good human-background contrast, but also non-intrusion into privacy. When the resolution of thermal imaging is low such that a few pixels are used to represent a person, the thermal image of the person appears as a blob without fine features about the person. Thus, the thermal image cannot be used to specifically identify the individual. Such technology can be used for the monitoring of elders and patients to provide care in response to certain situations, such as fall, without privacy intrusion.

For example, U.S. Pat. App. Pub. No. 2015/0377711, entitled "Apparatus and Method for Electromagnetic Radiation Sensing", discloses an apparatus for thermal imaging based on infrared (IR) radiation. Such an apparatus can be used for human detection, fire detection, gas detection, temperature measurements, environmental monitoring, energy saving, behavior analysis, surveillance, information gathering and for human-machine interfaces. Such an apparatus and/or other similar apparatuses can be used in embodiments of inventions disclosed in the present application. The entire disclosure of U.S. Pat. App. Pub. No. 2015/0377711 is hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

U.S. patent application Ser. No. 15/607,345, filed May 26, 2017, and U.S. patent application Ser. Nos. 15/797,693 and 15/797,999, both filed Oct. 30, 2017, disclose techniques to determine the floor plan or layout of a location that is being monitored using a thermal imaging device. An example of such a location is a room for an elder or a patient. Such techniques can be used in the thermal imaging system discussed in the present application. The entire disclosures of these applications are hereby incorporated herein by reference.

In general, the floor plan or layout of a location can be used to configure the capability of the thermal imaging system in detecting and/or interpreting events from thermal images. Such information can be used as a model of the environment and to understand the environmental and geographical features and factors of the scenery monitored by a thermal imaging device. The environmental model can be used with thermal images of the monitored location to classify events and control notification delivery. The thermal image of a typical room environment background lacks the details for the determination of an environmental model and can look indistinguishably uniform. The floor plan augments the thermal images to facilitate the event detection and classification. User interfaces discussed herein allow the use of user feedbacks and/or thermal inputs generated according to instructions presented in the user interfaces to determine and/or improve the floor plan and/or other image processing parameters used by the thermal imaging system in detecting and/or interpreting events.

Figure 1:
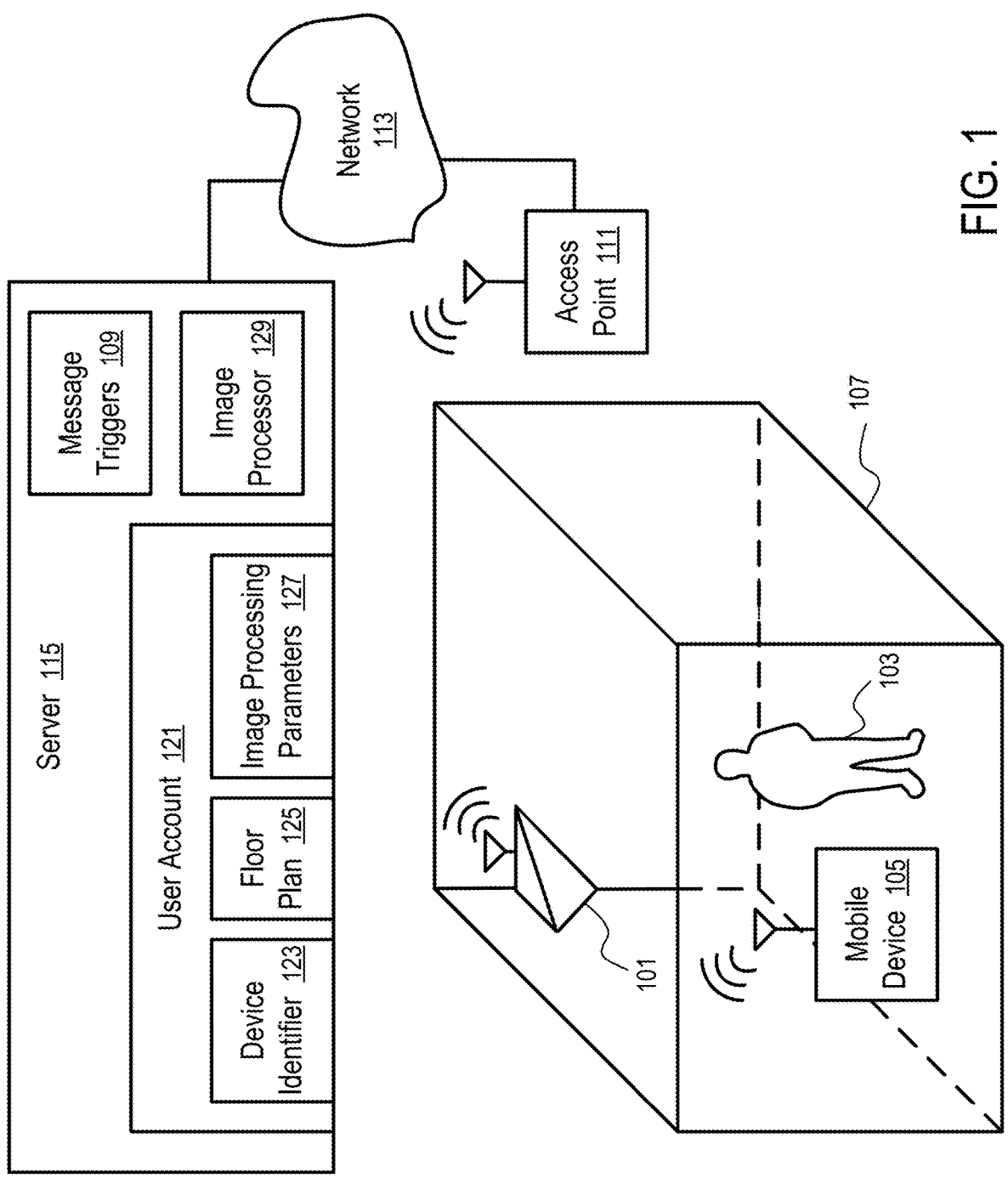
FIG. 1 shows a thermal imaging system according to one embodiment.

FIG. 1 shows a thermal imaging system according to one embodiment.

The thermal imaging system of FIG. 1 includes a server (115) and a thermal imaging device (101) that monitors the environment (107) by the way of thermal imaging. The thermal imaging device (101) is typically mounted at a fixed location in the environment (107), such as a room.

The Thermal Imaging System (TIS) of FIG. 1 further includes a mobile device (105) of a user (103) to provide a graphical user interface to configure the thermal imaging system of FIG. 1, to present notifications of detected events in the environment (107), and/or to receive user feedback on the notifications.

The thermal imaging device (101) and the mobile device (105) can be connected to the server (115) via a computer communication network (113). The server (115) processes the thermal images captured by the thermal imaging device (101) and provides services based on the thermal images.

For example, the thermal imaging device (101) can communicate the thermal images to the server (115) via a wireless access point (111) and a computer network (113) (e.g., a local area network and/or the Internet). The mobile device (105), such as a smartphone, a tablet computer, a laptop computer, or a personal media player, has a mobile application installed therein to communicate with the thermal imaging device (101) and/or the server (115) for calibration, setup, and/or the application usage of the thermal imaging system.

In some instances, the thermal imaging device (101) communicates the thermal images via a wireless connection, or a wired connection, to the mobile device (105), which functions as a host device to further communicate the thermal images to the server (115) for further processing. The host device, such as the mobile device (105) or another device in or near the environment (107), can pre-process the thermal images before providing the processing results to the server (115) for further processing and/or for event detection/classification.

The server (115) and/or the thermal imaging device (101) can provide the thermal images to the mobile device (105) for display and/or verification of the event detection/classification.

The server (115) can maintain a user account (121) that facilitates access control and customizes thermal imaging processing in a way specific to the environment (107) of the user (103).

For example, the user account (121) can have a device identifier (123) of the thermal imaging device (101) mounted in the environment (107). Further, the user account (121) can have a 2D or 3D floor plan (125) of the environment (107). The floor plan (125) identifies location features that specify attributes of regions within the environment. The location attributes can be used by the server (115) to classify events detected in the environment (107).

For example, the image processor (129) can use the floor plan (125) to detect events such as person fall on floor, person in bed, person out of detection area, person sitting, hazardous hotspot, multiple people presence, person moving, person in a predefined area, smoking detection, fire detection, human close to a hazardous hotspot, water leakage, human interaction with other humans, human interaction with other objects, unusual heat patterns of object detection, etc.

For example, the image processor (129) can identify a blob (e.g., a set of pixels) in a thermal image that has a temperature distribution different from the background thermal image and classify the blob as the thermal image of a person or a hotspot. When the thermal image of a person is detected, the image processor (129) can further classify the pose of the person (e.g., standing, lying down, sitting, walking). The server (115) can further interpret/infer the activity of the person from the thermal image of the person in view of the location features in the floor plan (125) of the environment and in view of the pose of the person and/or the shape of the thermal image of the person. The location of the person within the environment (107) relative to location features of the environment (e.g., path way, activity area, bed, chair, door, window) can be determined based on the line of sight projection of the thermal image relative to the 2D or 3D floor plan (125). The location of the person in the thermal image can be used to interpret and/or classify the event associated with the person.

One aspect of the disclosure discussed herein includes a user interface provided on the mobile device (105). The user interface facilitates the human verification and authentication of a particular feature set of the thermal imaging system, where the feature set is configured to detect a predetermined type of events specific to the environment (107). The user interface is programmed to automatically guide interaction between the user (103) and the thermal imaging system to test and validate the detection of a class of events. The human verification and authentication improves the configuration of the thermal imaging system and improves the accuracy in event classification and/or notification.

Further, the user interface can provide a feedback or instruction to the user and guide the user to perform further configuration operations to improve and/or validate the accuracy of the results generated from the feature set.

Using the user interface provided in the mobile device (105), a person without technical skill can interact with the thermal imaging system to produce a thermal state in the environment, causing the thermal imaging system to analyze the thermal state and generate a notification about the thermal state. The person can then further use the mobile device (105) to validate the authenticity of the state as being identified in the notification. The user interface guides the user through a simplistic and logical process, whilst the system automatically annotates such intervention and stores it in memory to improve its image processing parameters (127) for processing thermal images from the thermal imaging device (101) represented by the device identifier (123) in the user account (121). The improved image processing parameters can be used by the server (115) to generate improved outcomes in processing subsequent thermal images generated by the thermal imaging device (101).

The user interface can be used for continued improvements of the imaging parameters (127) using the services of the thermal imaging system. When the server (115) generates a notification of a detected event in the environment, the user interface on the mobile device (105) can present the notification and receive a user feedback that rates the accuracy of the notification. The user feedback can be used to adjust the imaging parameters to improve further event classification and notification in the user account (121) and decrease false alarms.

For example, after the thermal imaging device (101) captures a thermal image of the environment (107) using an array of infrared sensing pixels, the server (115) (or the mobile device (105) or another host device, or the thermal imaging device (101)) can use computer vision techniques to analyze the content of the thermal image. In general, any computer vision techniques known in the field can be used to extract content of thermal objects from the thermal image. The thermal objects generally have temperature different from the thermal background of the environment. Examples of the thermal objects can include persons, pets, stoves, televisions, etc. For example, simple threshold segmentation can be used to extract objects of certain temperatures above or below a threshold from the thermal background.

Humans typically have a higher temperature than a background. Thus, a segmentation can be applied to extract the thermal images of humans from the background. A blob analysis in terms of blob orientation, blob shape, blob neighboring pixels can be performed to extract information about a shape, pose, and/or activity of a human. For example, blob proportions may provide insight into the posture of a human.

Some objects can have human-like temperatures, but are typically static. Thus, a temporal analysis of blob movement and blob shape changes (spatial blob changes) can be performed to filter out static "hot spots" such as TVs, PC monitors, home appliances.

For example, an artificial neural network can be trained to classify thermal blobs extracted from the thermal image captured by the thermal imaging device (101).

The thermal imaging system of FIG. 1 can have messaging capabilities. Message triggers (109) can be programmed to send notifications in response to a predetermined type of events identified/detected/classified from the thermal images from the thermal imaging device (101). For example, a notification triggered by the detection of a predetermined type of events, such as person fall, can be sent to a user of the account (121) using short message service (SMS), email, push notification, an application programming interface (API), etc. In some instances, the notification can trigger a physical alarm in the form of sound, siren, light and the like.

For example, in response to the detection of a thermal event corresponding to a hazardous hotspot or fire threat alarm, an alarm notification can be transmitted to an address and/or device identified in the user account (121). For example, the event of hazardous hotspots or fire threat alarms can be programmed to triggered by the identification of a thermal blob having a temperature above a threshold (e.g., 200 degrees Celsius).

The detection techniques can be implemented in the image processor (129) of the server (115) or in a host device, such as the mobile device (105), or in the thermal imaging device (101).

Using the image processor (129), the server (115) can detect a human (103) in a thermal image captured by thermal imaging device (101) when the human enters the environment (107) within the field of view of the thermal imaging device (101). For example, the environment (107) can be a room with services for elders and/or patients.

The server (115) can use the spatial and temporal information about the detected human (103) to provide human activity data. Such data can include human resting, human active, human out of sight, or human falling.

For example, to perform human fall detection, the blob of thermal image that represents the human (103) can be extracted based on the typical temperature range of humans. The server (115) can analyze the orientation and/or shape of the blob to determine whether the human (103) is considered to be standing. For example, when the height to width aspect ratio of the human blob is higher than a threshold, the human (103) can be considered as standing. For example, when the horizontal extension of the blob is larger by a factor than the blob's height, the server (115) can classify the human action/activity as lying, if the human blob is within an area that has a higher than a threshold probability of having a human lying down, according to the floor plan (125). Examples of such areas include a bed where a person may rest, an activity area where a person may lie down or fall, a hall way, etc. The server (115) can further use the temporal changes in the shape of the human blob to classify the action/activity of the human (103).

For example, a determination of the human blob representing the human (103) lying in an activity area or hall way can cause the server (115) to determine that an event of human falling has been detected. The server (115) can be configured to trigger an alarm and/or a notification if the human is determined to be in a fall position for a period of time that is longer than a threshold. For example, a notification can be transmitted to a tablet computer of a nurse to prompt the nurse to take actions. The notification can identify the environment (107) (e.g., a specific room) such that the nurse may offer help if needed.

When the thermal imaging device (101) has a low resolution, the thermal monitoring is non-intrusive and protects the privacy of the occupants of the environment (107). However, the low-resolution monitoring can lower accuracy in activity and/or object detection. When the thermal imaging has fewer pixels, the image processor (129) has less detail and information to work with. For example, a human head can be displayed as a single pixel, making it impossible to detect any facial details, thus making it challenging to precisely detect activity or feature patterns. However, at the same time, such low-resolution imaging provides insufficient detail for human identification and thus improved privacy. Merely a human detection is possible where humans can be detected or recognized with a certain degree of probability.

For example, the criteria for fall detection can include a horizontal orientation of a human hot-blob. However, the horizontal position of a human could be interpreted as a fall, but also, could be a person lying in bed or on a sofa. A limited resolution has limitations on the accuracy but is desirable for privacy reasons.

When the thermal imaging device (101) has a low resolution, the mobile device (105) can be configured to use user interfaces to obtain information to improve the accuracy of the thermal imaging system in detecting events related to humans.

FIGS. 2-21 illustrate examples of user interfaces to configure the thermal imaging system according to one embodiment. The user interfaces are discussed below in connection with the methods of FIGS. 36-40.

Figure 36:
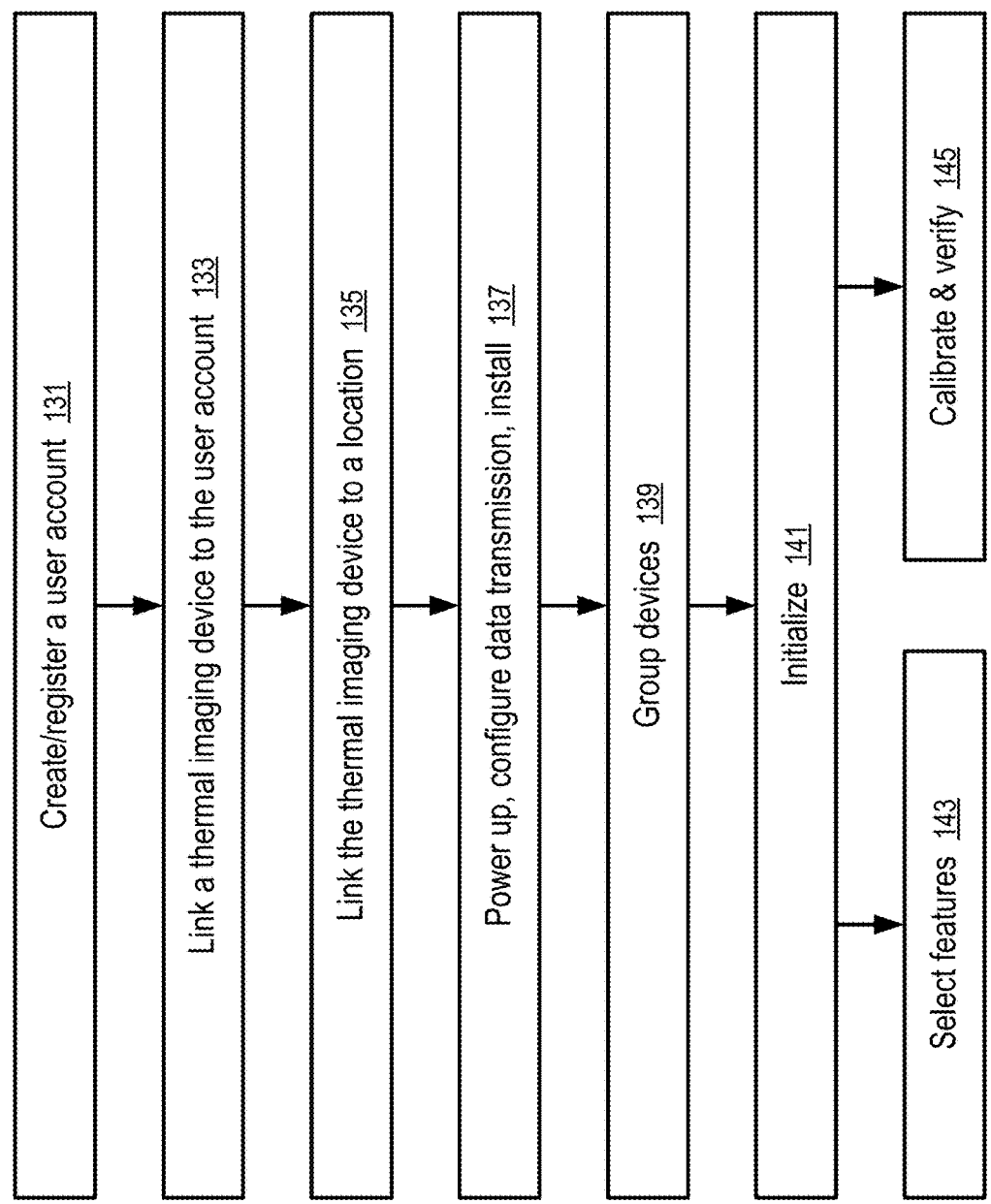
FIG. 36 shows a method to set up a thermal imaging device at a location for monitoring according to one embodiment.

FIG. 36 shows a method to set up a thermal imaging device (101) of a thermal imaging system of FIG. 1 in an environment (107).

At block 131, the server (115) creates or registers a user account (121). For example, an installer or a user of the thermal imaging system can use the account (121) to interact with the thermal imaging system, such as registering the device identifier (123) of the thermal imaging device (101), running a mobile application on the mobile device (105) to access services provided via the thermal imaging device, and optionally using the mobile application to provide information to generate the floor plan (125) of the environment (107) monitored by the thermal imaging device (101) and/or provide image processing parameters (127) to configure and improve the event detection accuracy in processing the thermal images in the user account (121).

Figure 2:
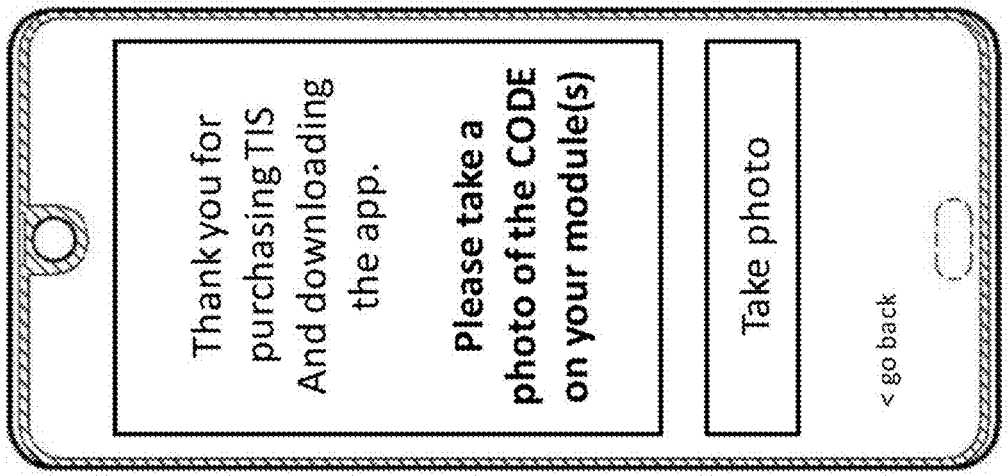

At block 133, the server (115) stores the device identifier (123) to link a thermal imaging device (101) to the user account (121). For example, after the thermal imaging device (101) is physically obtained and for example unboxed, the user (103) can use the mobile application to link the thermal imaging device (101) to the user account (121). For example, the mobile device (105) can be a smartphone having a camera and an Internet connection; and the mobile application running in the smartphone can use its camera to capture or scan a bar code having the device identifier (123) of the thermal imaging device (101) to cause the server (115) to link the thermal imaging device (101) to the user account (121). Alternatively, the mobile device (105) can be physically connected via a cable and/or connector to the thermal imaging device (101) (e.g., using a universal serial bus (USB) cable) to link the thermal imaging device (101) to the user account (121); and the communication to establish the link between the thermal imaging device (101) and the user account (121) can be made via a wireless and/or wired communication connection between the mobile device (105)/the thermal imaging device (101) and the server (115). Through a user interface provided by the mobile device (105), the thermal imaging device (101) is configured to communicate with the server (115) without further assistance from the mobile device (105). Thus, after the configuration of the communication connection between the thermal imaging device (101) and the server (115), the mobile device (105) can be physically disconnected from the thermal imaging device (101). Further configuration of the thermal imaging device (101) can be performed via a wireless connection or a wired connection. For example, a user interface as illustrated in FIG. 2 can prompt the user to capture an identification code of the thermal imaging device (101) to link the thermal imaging device (101) to the user account (121). Alternatively, the user (103) can use a website of the server (115) to link the thermal imaging device (101) to the user account (121) by entering a serial number of the thermal imaging device (101).

Figure 3:
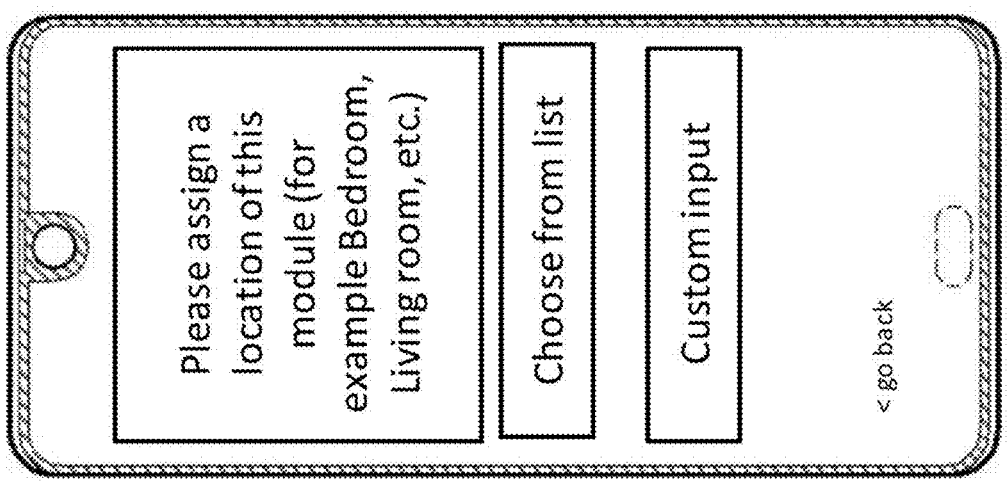

At block 135, the server (115) stores data to link the thermal imaging device (101) to a location, such as an address of the environment (107) to be monitored by the thermal imaging device (101) and/or the room number or description that identifies the particular location of the monitored area of the thermal imaging device (101) at the address. For example, a user interface as illustrated in FIG. 3 can prompt the user to identify the location.

The association between the thermal imaging device (101) and the location can be specified and/or modified at any time. However, using the user interface, e.g., as illustrated in FIG. 2 to guide the user through the process can make the installation procedure very user friendly and simple.

More than one thermal imaging device can be assigned to monitor the same location. For example, a living room may be large and a number of thermal imaging device (e.g., four) may be needed. For example, each corner of a room can have a thermal imaging device installed thereon.

At block 137, the thermal imaging system can instruct the user to power up the thermal imaging device (101), configure data transmission from the thermal imaging device (101) to the server (115), and install the thermal imaging device (101). For example, the data transmission can be configured to be performed via a wireless local area network (e.g., WiFi) that is connected to the Internet, or via a wired connection to a server (e.g., ethernet). For example, the installation of the thermal imaging device (101) can be performed by simply removing backings of adhesive tapes pre-installed on the thermal imaging device (101) and attaching the thermal imaging device (101) to one or more surfaces in the environment. For example, the installation and calibration techniques disclosed in U.S. patent application Ser. No. 15/607,345, filed May 26, 2017, can be used. The entire disclosure of the patent application is hereby incorporated herein by reference. The installation 137 can be repeated for the thermal imaging devices (e.g., 101) used to monitor the environment (107). Optionally, the operation at block 137 can be processed before the operation(s) of block 135 and/or block 133. For example, the powering up of the thermal imaging device can be performed prior to the linking of the thermal imaging device to the user account (133) and/or linking of the thermal imaging device to a location. In general, the operations of powering up the thermal imaging device (101), configuring its data transmission, linking it to a user account and linking it to a location can be performed in an arbitrary order.

Optionally, at block 139, thermal imaging devices (e.g., 101) can be grouped based on scenery and/or rooms. The grouping of devices can be done prior to system initialization at block 141 so that the user (103) can save time in successive steps.

Figure 4:
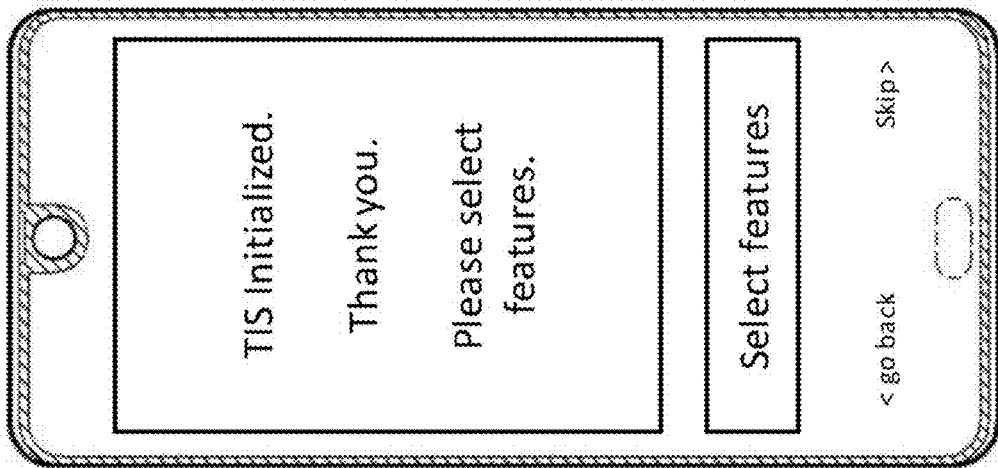
FIGS. 2-21 illustrate a set of user interfaces to configure the thermal imaging system according to one embodiment.

At block 141, the thermal imaging system performs initialization for the newly installed thermal imaging devices (e.g., 101). Thus, the server (115) is set up and read for configuration. A user interface as illustrated in FIG. 4 can be used to inform the user (103) of the success in initialization and to guide the user (103) through the configuration process.

At block 143, the configuration process can optionally include the selection of features that have predefined event detection services.

At block 145, the configuration process can optionally include the calibration and verification operations to test and fine tune selected features of event detection.

In some instances, certain features can be pre-selected; and the user (103) is provided with the user interface to choose from a range of features based on the needs of the user and/or adjust the selections. The feature selection (143) can be done post verification (145); however, the verification may be more effective once features are known.

Figure 5:
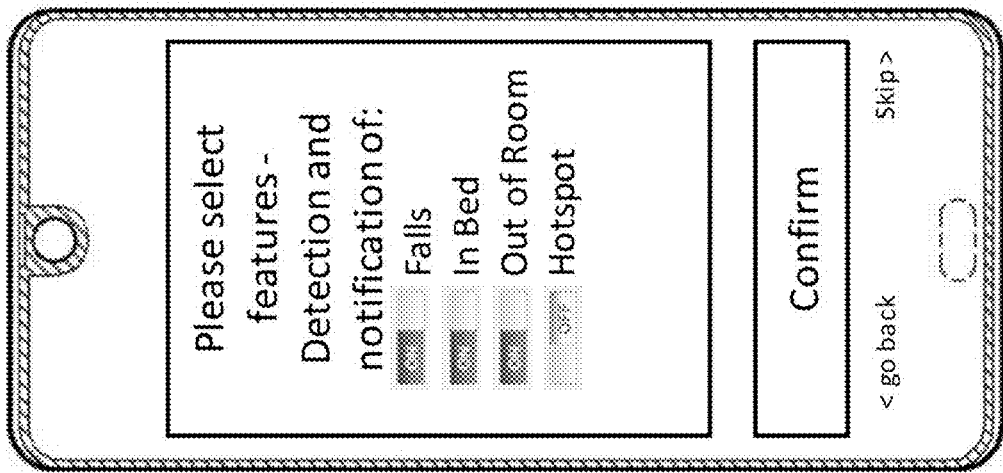

For example, after a user interface as illustrated in FIG. 4 acknowledges the successful initialization, a user interface as illustrated in FIG. 5 guides the user (103) to select features from a list. Some features can be included in a certain subscription plan, whilst other features can be add-on services, for which the user (103) can be charged separately. Some features may be free of charge, while some features may be offered for a fee and have terms and conditions attached to them.

The physical installation can include any type of thermal imaging devices (e.g., 101), without any limitations on resolution, orientation or position of the thermal imaging devices (e.g. 101). Optionally, the thermal imaging devices (e.g., 101) can include other sensors besides the image sensors for thermal imaging.

Due to a thermal equilibrium in the room, many room items can have a similar temperature and emissivity appearing with low or no contrast in the thermal image of the environment (107). The similar temperature makes the items virtually indistinguishable in the thermal band from the room background. Hence a thermal image of the environment may look uniform without sufficient information about layout and objects of a room. Thus, the thermal image cannot be used to determine a floor plan (125) that identifies the location features in the environment (107). Location features provide attributes of sections of areas in the environment (107) that can be used to interpret the human activities in the environment and facilitate event detection.

U.S. patent application Ser. No. 15/607,345, filed May 26, 2017, discloses some techniques to obtain geographic information of the scenery to determine the floor plan (125) and to calculate a reference for the determination of the dimensions of objects/subjects identified in the thermal image.

Figure 37:
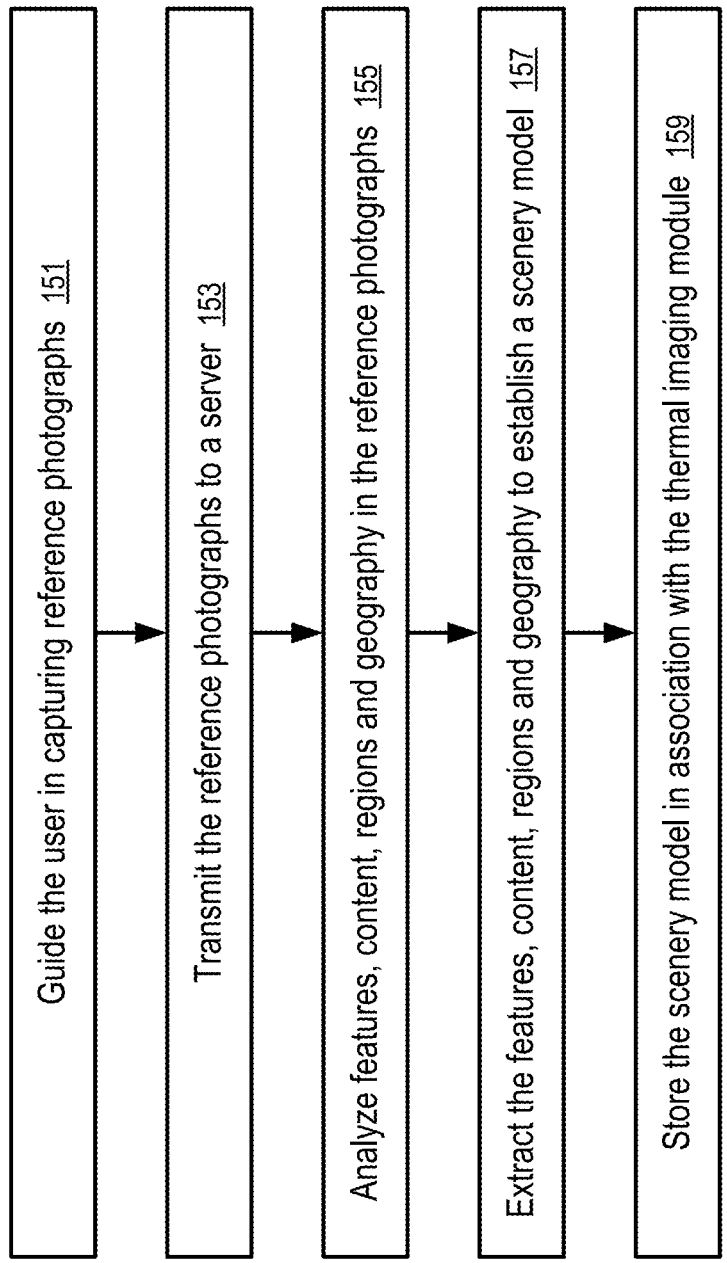
FIG. 37 shows a method to establish a scenery model for monitoring a location according to one embodiment.

FIG. 37 shows a method to establish a scenery model for monitoring a location according to one embodiment.

Figure 7:
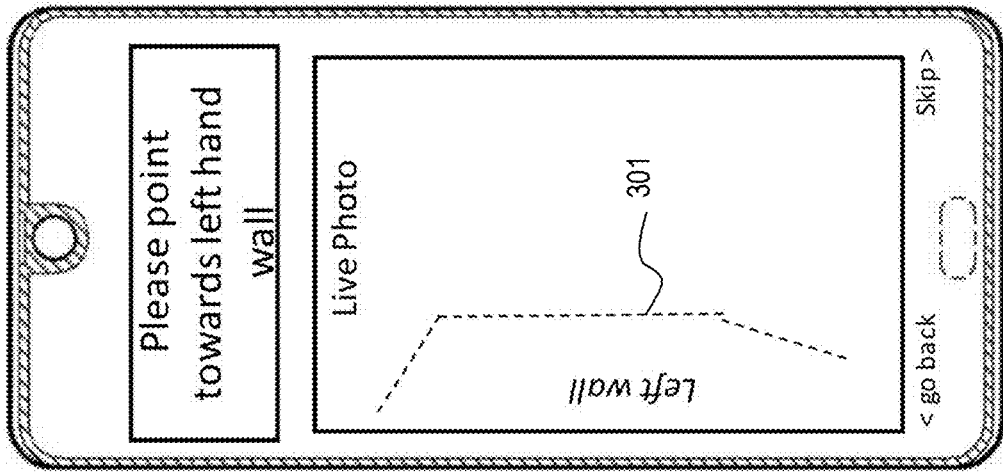
Figure 6:
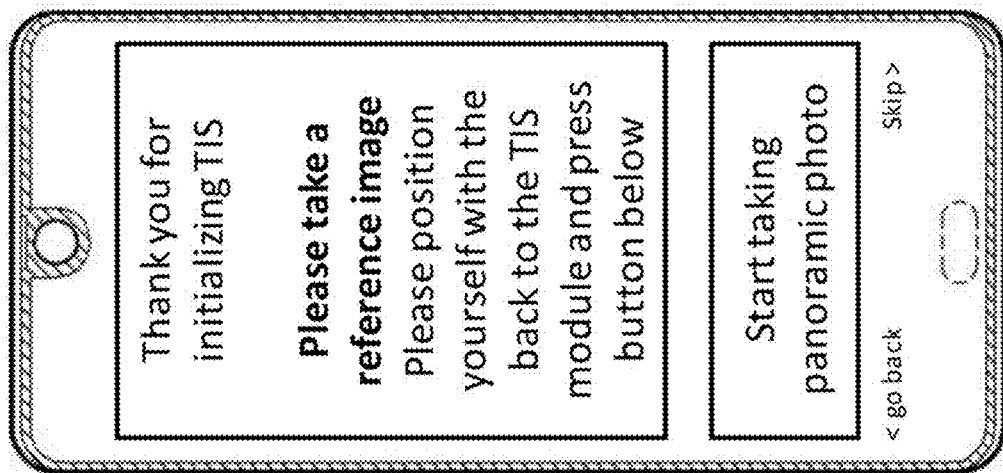

At block 151, the mobile application running in the mobile device (105) guides the user in capturing reference photographs, as illustrated in FIGS. 6 and 7.

FIGS. 6 and 7 illustrate user interfaces to use the mobile application running in the mobile device (105) to guide the user to capture photographs of the environment (107) for the generation of the floor plan (125). The user is guided by a set of instructions over the user interface to take one or more reference photographs of the environment (107).

For example, the instructions can ask the user to orientate a camera associated with the user (103) and the user account (121) (e.g., the camera of the mobile device (105), such as a smartphone) in the same direction as the thermal imaging device (101) and take a reference photo from such an orientation. For example, if the thermal imaging device (101) is mounted on an edge or corner of a room, the user is instructed to stand in the corner or near the edge to take a picture in an orientation that is substantially consistent with the viewing orientation of the thermal imaging device (101).

For example, the user interfaces provided on the mobile device (105) can instruct the user to point the camera (e.g., of the mobile device (105)) towards a specific region, as illustrated in FIG. 6. Examples of such a region is a wall of a room. The server (115) or the mobile application running in the mobile device (105) can perform a computer vision analysis to detect boundary lines of the region, such as a wall. For example, the live view in the user interface as illustrated in FIG. 7 provides a layout indication (301) and a layout annotation (e.g., left wall) that are overlaid on the live view of the camera for the user to find such specific region easier. If a particular region is absent from the environment, the user interface can instruct the user to capture a reference photo of a next region (e.g. right wall, if left wall not seen).

For example, the user interfaces can instruct the user (103) to take a panoramic photograph of the environment from an orientation similar to that of the thermal imaging device (101). A panoramic photograph can be obtained by panning the camera from one section of the region to another. Further, the user interface can instruct the user to point the camera to regions of interests, such as a bed, or a TV or a door.

At block 153, the mobile device (105) transmits the reference photographs to the server (115).

At block 155, the server (115) and/or the mobile application running in the mobile device (105) can analyze the features, content, regions and geography in the reference photographs.

At block 157, the server (115) and/or the mobile application can extract the features, content, regions and geography from the reference photographs to establish a scenery model, such as the floor plan (125).

At block 159, the server (115) stores the scenery model in association with the thermal imaging module (101).

For example, the reference photographs can be analyzed to identify location features (e.g., regions of predefined types), such as beds, windows, doors, lights, appliances, furniture, etc. Such features are typically visible and identifiable in the photographs captured in light bands visible to human eyes and by the camera of the mobile device (105). In some lighting conditions, location features with bright and high intensity can be identified easier than other features. The location features can be extrapolated into a 3D space model to generate the floor plan (125) that annotates different sections of the environment with attributes that can be used for event detection, identification, and/or classification.

In some instances, the user interface provided by the mobile application can include an augmented reality (AR) ruler and measurement tool. Thus, some geometric features can be extracted from the visual photograph, either automatically or with the aid of inputs provided by the user (103).

Alternatively, the user can have an option to configure a blank or pre-set 3D model space with features, and build a 3D model of the environment (107) using the mobile application.

The visual references generated using the user interfaces of the mobile application can be limited in accuracy, due to the unknown distance and orientation between the location of photography by user and the actual module placement. Further, the computer vision and augmented reality (AR) tool may have limitations to its detection accuracy. However, the visual references can provide a valuable first approximation of the location features in the floor plan (125) of the environment (107). The process can be repeated to increase the accuracy of the model built using the visual references. Thus, the thermal imaging device (101) does not require a visual camera for capturing images in lights visible to human eyes. Including a camera in the thermal imaging device (101) can raise privacy concerns. The visual referencing is performed using an alien tool (e.g., the mobile device (105) that is not part of the thermal imaging device (101) during the normal operation/monitoring of the environment (107)). The performance of the visual referencing is limited to the installation/configuration process. Hence privacy concerns can be reduced or eliminated. The visual referencing does not require lots of effort from the user (103). It is designed to be user friendly and take only a few moments, and is cost effective as the camera of the mobile device (105) is used, which is already available. No additional camera is required to perform the task of visual referencing. Should layout of the room change over time (e.g., moving bed or furniture, or the thermal imaging device (101)), then the visual referencing can be repeated. In such an instance of layout changes, the user interface provided on the mobile device (105) can prompt the user to re-capture visual references, such as when the image processing in the system does not correlate with the references that have been configured previously.

For example, the server (115) and/or the image processor (129) can be configured to: guide the user (103) to capture reference photographs (e.g., as illustrated in FIGS. 6 and 7), analyze the photographs to identify location features and construct the floor plan (125) (with or without persistent storage of the photographs) using visual image processing techniques and tools such as AR measurement tool, extract location features, content, regions and geography and generate a 3D model of the environment, and store the model as the floor plan (125) with location information associated with the identifier (123) of the thermal imaging device (101).

The server (115) can use the floor plan (125) to classify events. For example, in response to a determination that a human (103) is in a horizontal position, the server (115) can classify the event as "human in bed" when the human (103) as detected in a thermal image is located in a bed region, and classify the event as "human falling" when the detected human (103) is located in a hall way or an activity area.

In some instances, the floor plans (e.g., 125) of multiple rooms can look similar. For example, an elder care facility may have a same floor plan for many rooms. Hence the floor plan (125) of one room can be used for other rooms, by simply referencing or copying the floor plan (125). In some instances, a library of pre-built floor plans can be presented for select as a starting point for building the floor plan (125) for the environment (107). The floor plan setting can be optional in the initialization process of the Thermal Imaging System (TIS).

Figure 38:
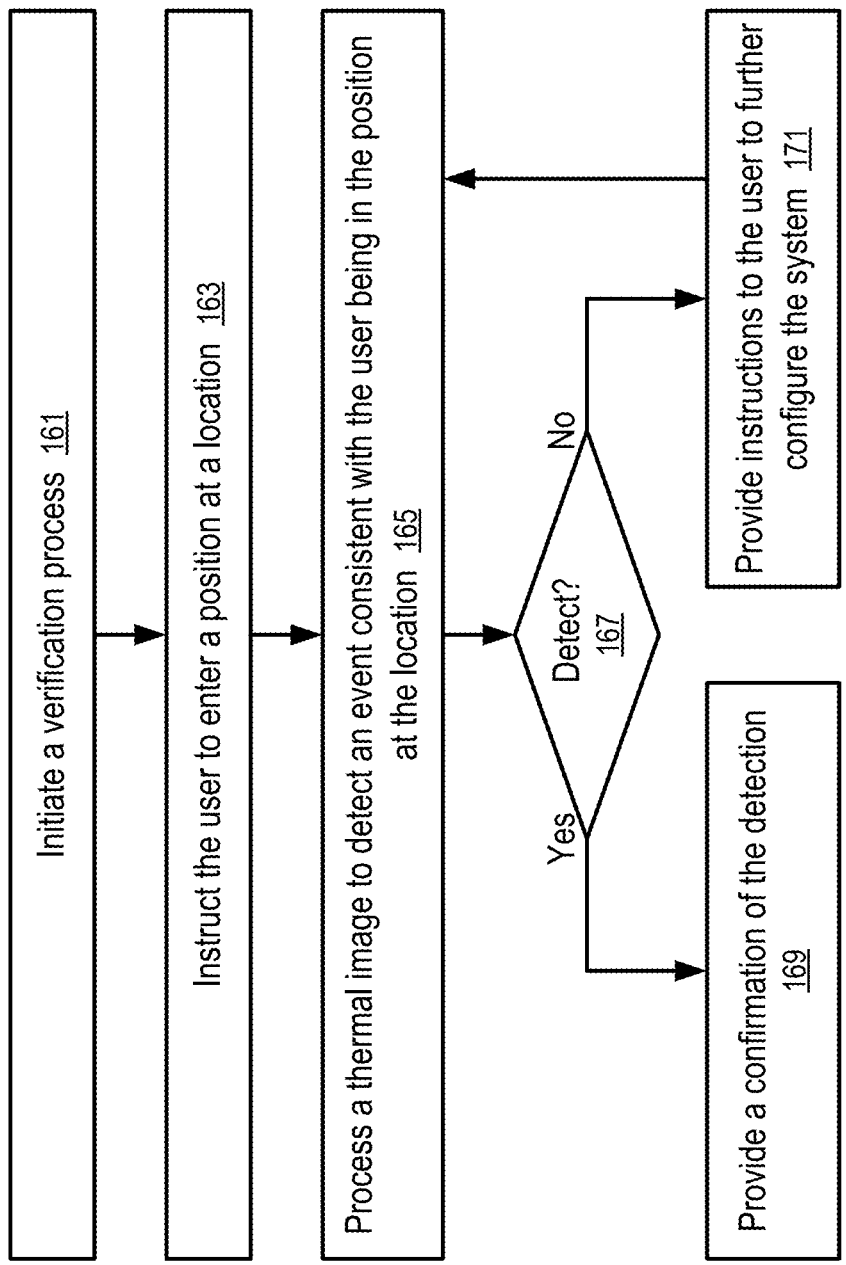
FIG. 38 shows a method to validate an event detection model and parameters for monitoring a location according to one embodiment.

FIG. 38 shows a method to validate an event detection model and parameters for monitoring a location according to one embodiment.

After establishing referencing and calibrating parameters, the server (115) is operational in classifying events based on the thermal images from the thermal imaging device (101). The method of 31 can be used to test and/or validate the detection features of the thermal imaging system. The verification can be done optionally or as part of the calibration and configuration process.

The general problem of computer vision techniques is that 100% accuracy cannot be provided or guaranteed. Some small unknown factors such as partial occlusion, changes in the scenery or unexpected features can disrupt computer vision and provide a false outcome.

To overcome such shortcomings, the mobile application running in the mobile device (105) can provide a user interface to facilitate a human verification/validation of certain events detected by the thermal imaging system. The validation can be used to verify whether the system can detect an event that should be detected by the system, whether an event reported to be detected by the system is actually present in the environment (107) (e.g., false positive), and/or whether an event detected by the system is correctly classified. The user interface allows the user (103) to provide feedback to the thermal imaging system to annotate its detecting results and thus improve the accuracy of the system. Such a method to improve the accuracy of the thermal imaging system can be very valuable. Over time and over a number of feedback loops the system can refine and offer highly accurate results.

At block 161, the method of FIG. 38 initiates a verification process.

At block 163, the mobile application instructs the user to enter a position at a location. Such location can be identified using the floor plan (125). In general, it is optional to perform the operations of floor plan determination. For example, to perform "in bed detection" the panoramic photo may or may not be obtained for floor plan determination prior to the services of "in bed detection".

At block 165, the thermal imaging system processes a thermal image to detect an event consistent with the user being in the position at the location (165).

At block 167, the mobile application determines whether the thermal imaging system has detected the event.

At block 169, the mobile application provides a confirmation of the detection based on a user input to the mobile application, when the thermal imaging system is able to detect the event.

At block 169, the mobile application provides instructions to the user to further configure the system, when the thermal imaging system is not able to detect the event consistent with the user being in the position at the location (165).

Figure 9:
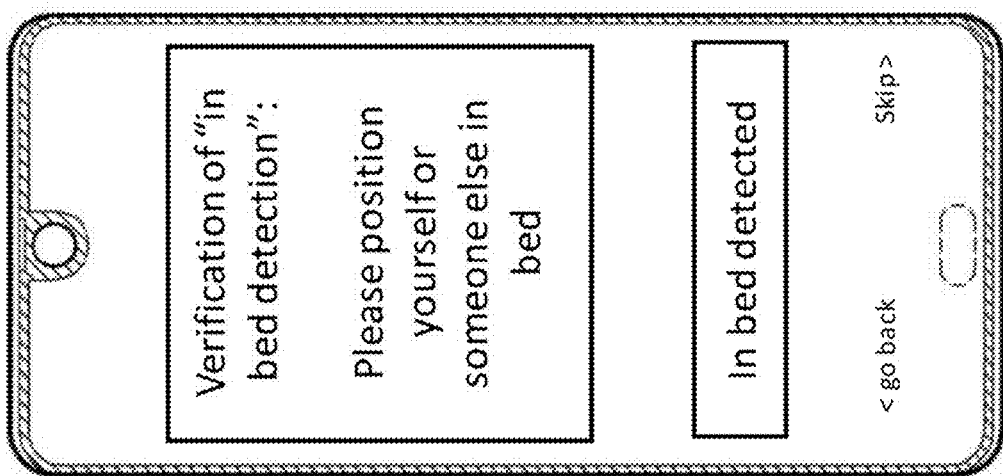
Figure 8:
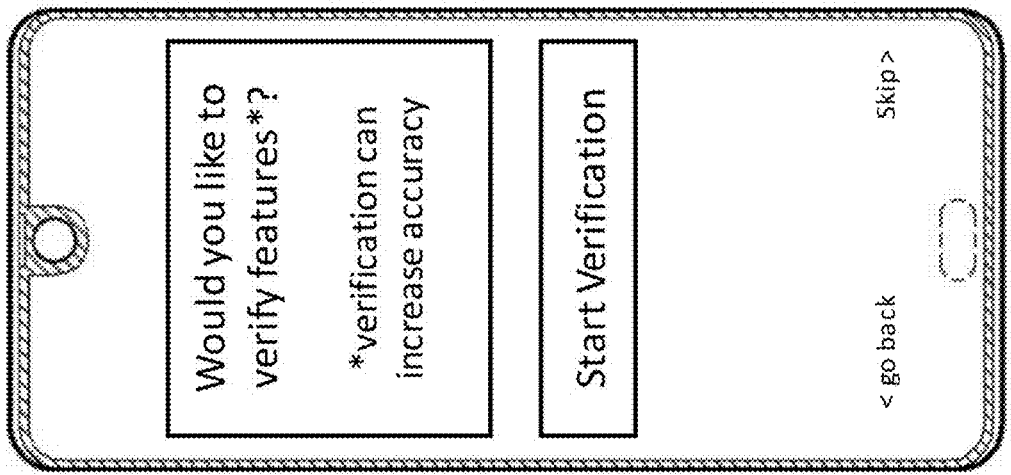

For example, FIG. 8 illustrates a user interface to start a verification process. Each detection feature can be verified, one-by-one, or it can be skipped or verified at a later point in time. For example, for the feature in bed detection, a subject is instructed to lay in the bed, as illustrated in FIG. 9. The subject can be either the user (103) or someone else.

Figure 10:
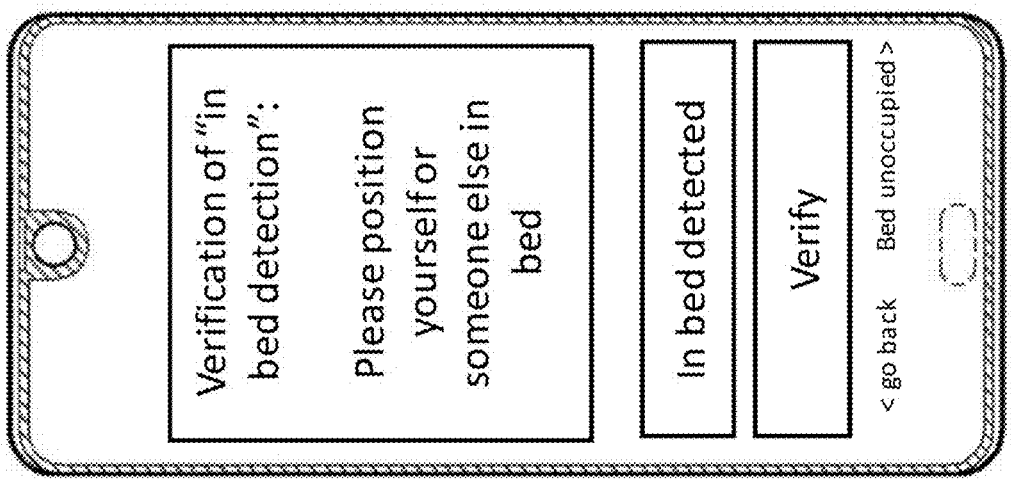

If the thermal imaging system is able to detect the event of human in bed, the user interface illustrated in FIG. 9 reports the detection using the message "In bed detected" and allows the user to provide a confirmation by selecting the "Verify" button in FIG. 10. The message "In bed detected" can be highlighted (e.g., via color scheme, font, and/or animation). For example, the detection can be performed based on detecting a blob in the of thermal image having a temperature in the range of the body temperature of humans, and based on a determination that the blob is in a horizontal orientation, and optionally the blob is in a bed area identified by the floor plan (125).

Optionally or in combination, an acoustic signal or notification can be played to indicate the successful detection. If the detection is accurate and true, the user interface prompts the user to provide a feedback, such as clicking the "Verify" button illustrated in FIG. 10.

Once the human verification is received in the thermal imaging system, the server (115) can stored the position and/or other characteristics of the human blob extracted from the thermal image as the image processing parameters (127) associated with the verified detection feature (e.g., human in bed). Thus, when a subsequent detection matches the image processing parameters, the likelihood of an accurate detection is improved.

Figure 22:
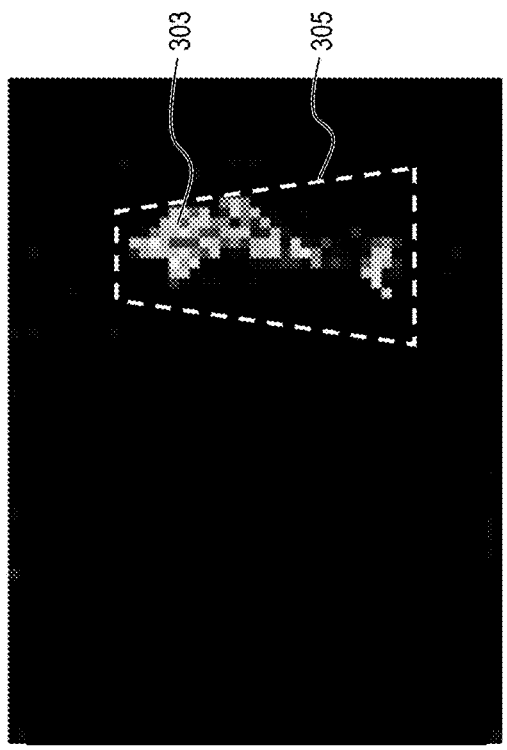

FIG. 22 illustrates an example of a low resolution thermal image having a blob (303) of a human subject in an annotated bed area (305). The subject can be highlighted by default background subtraction. The background appears black in the image of FIG. 22, whilst the subject represented by the blob (303) has a grayscale and contrast against the background. The subject's position can be determined based on its blob size, shape and orientation. In this example, the orientation of the subject is horizontal; and the thermal imaging system determines that the subject is in bed and lying. From the orientation and size of the blob (303) representing the human subject, the server (115) can estimate the perimeter of the bed area (305), which can be used to augment the floor plan (125) and/or can be stored as part of the image processing parameters (127).

In some instances, the detection result message (e.g., "In bed detected") may not be accurate or true. For example, a subject comes close to the bed, or sits down on a sofa close to the bed; and in response, the thermal imaging system may mistakenly conclude that the subject is in bed and thus provide the false indication of the detection result. In such a situation, the user interface illustrated in FIG. 10 allows the user to select "Bed unoccupied" to provide a feedback to correct the thermal imaging system. The feedback can overwrite a parameter associated with the detection of human in bed. For example, the server (115) can mark in the floor plan (125) the region occupied by the human blob as "not bed", such that when a human blob is detected in the area again, the server (115) does not classify the presence of the human in the area as human in bed.

Figure 11:
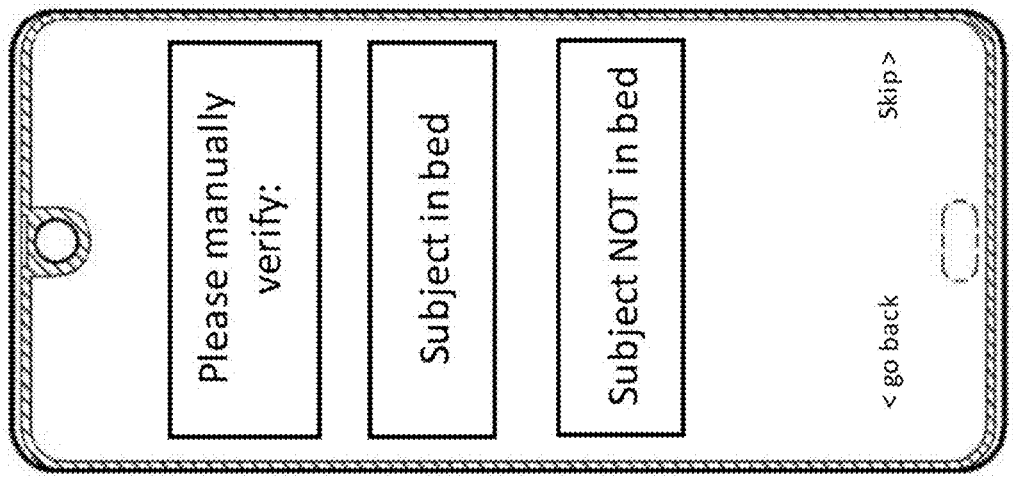
Figure 12:
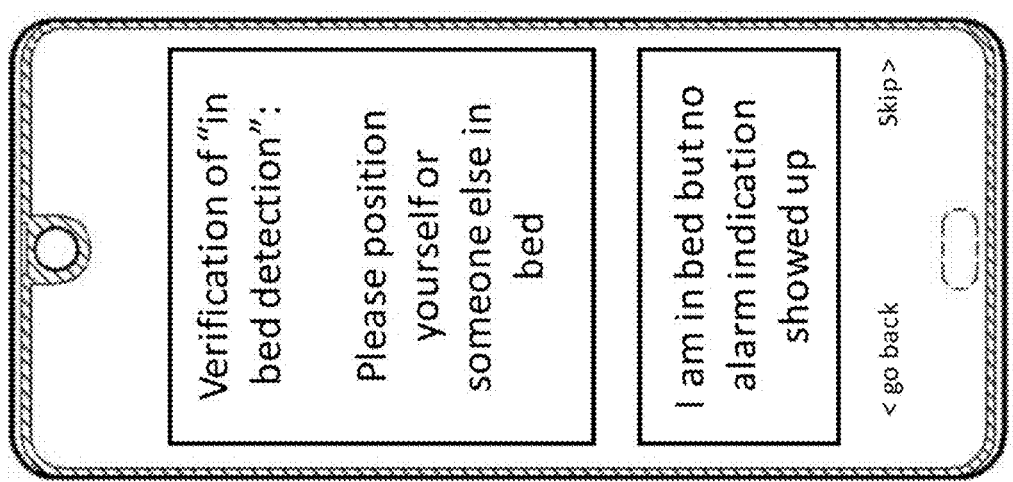
Figure 13:
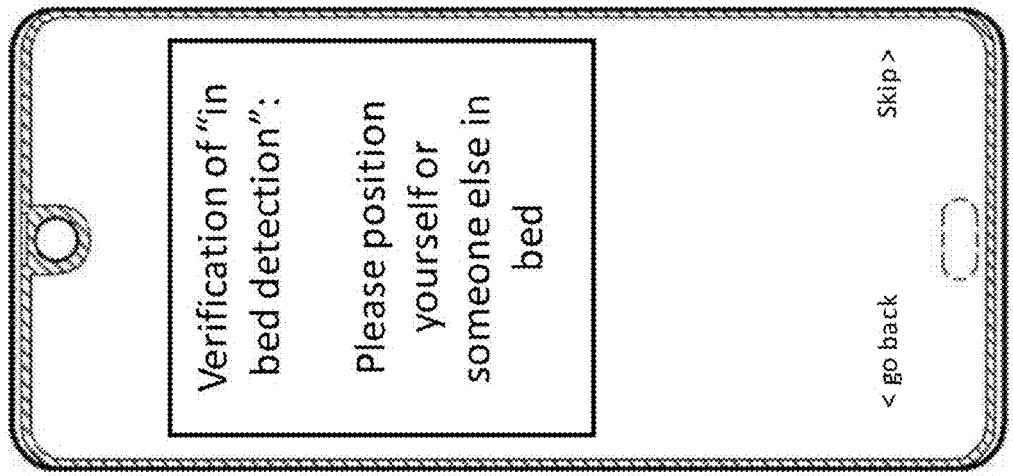

In other instances, when a subject is in bed, as instructed via the user interface of FIG. 11, but the thermal imaging system fails to determine that the thermal image is showing a human in bed, the user interface of FIG. 12 can be presented after a period of time to indicate that the system failed to detect the event. When the user selects the button "I am in bed but no alarm indication showed up", a user interface as illustrated in FIG. 13 can be presented to prompt the user to specify whether a human subject is currently in bed or no human subject is currently in bed. A selection made by the user in the user interface of FIG. 13 can be used by the server (115) to adjust the floor plan (125) and/or the image processing parameters (127) to improve the detection calculation.

For example, if the user confirms that a subject is in bed by clicking the button "subject in bed", the parameters of human blob shape, human blob type, human blob orientation and location can be used to adjust computer vision computation to arrive at the conclusion that the blob representing a human in a horizontal position, and/or the floor plan can be adjusted to show that the location of the blob is a bed area. Thus, this specific shape, location, orientation, size and temperature profile of the blob shall be associated for positive identification of human in bed.

Due to the orientation and possibly the imaging distortion of the thermal imaging device (101), a blob showing a subject lying can have proportions similar to a blob showing a subject standing. The verification process as illustrated above using the user interfaces of FIGS. 11-13 allows the thermal imaging system to fine tune the detection parameters to generate accurate results.

For example, when the user selects the button "subject in bed" in FIG. 13, the server (115) can adjust or customize the size, shape, ratio thresholds for orientation classification for the region occupied by the blob (303) and for the thermal image device (101) to allow the system to reach a conclusion that the human subject is lying and thus facilitate the determination of human in bed.

Figure 23:
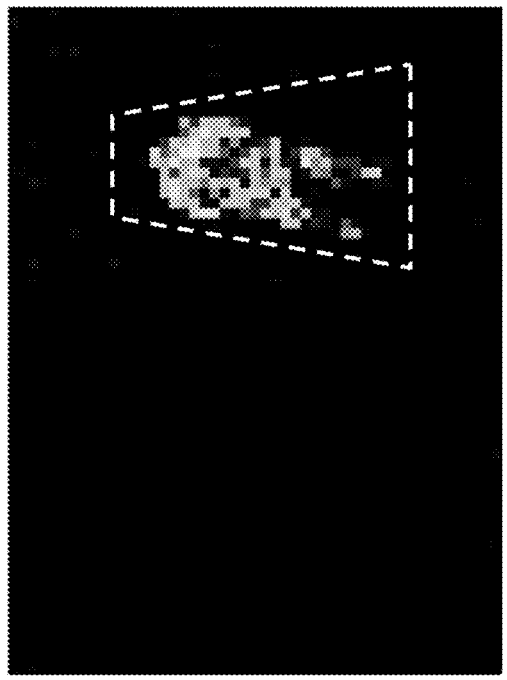
FIGS. 22-24 illustrate a process to identify a location feature in a floor plan used by the thermal imaging system according to one embodiment.
Figure 24:
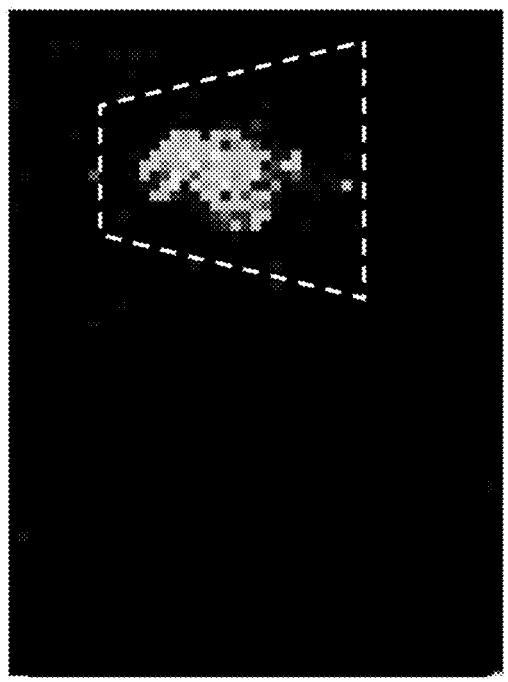
Figure 26:
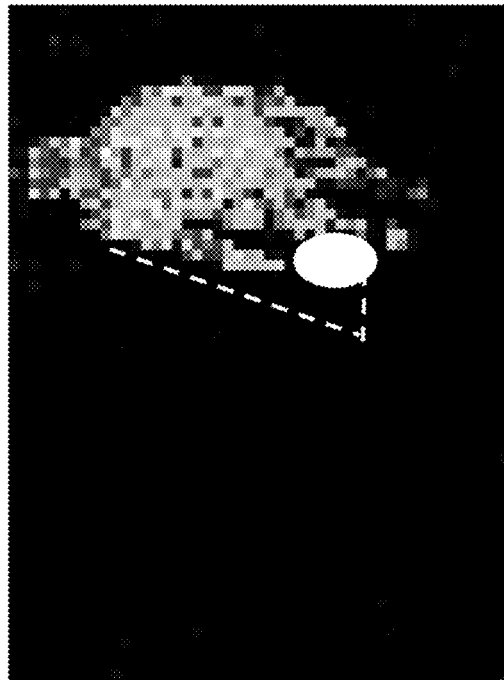
FIGS. 25-28 illustrate a process to identify a set of parameters for event detection in the thermal imaging system according to one embodiment.
Figure 28:
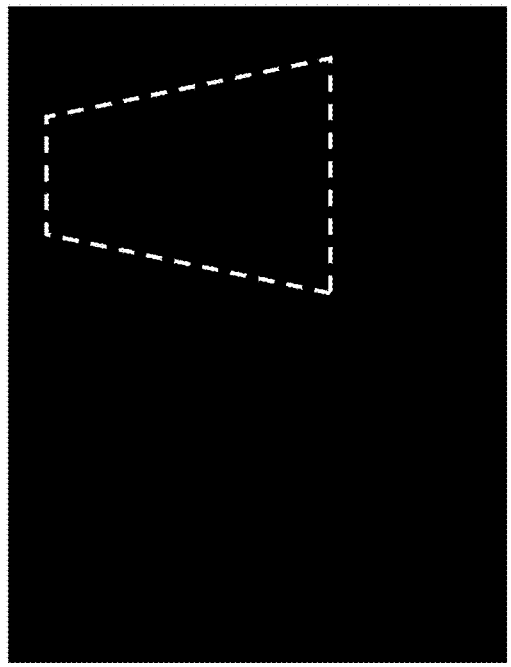
Figure 25:
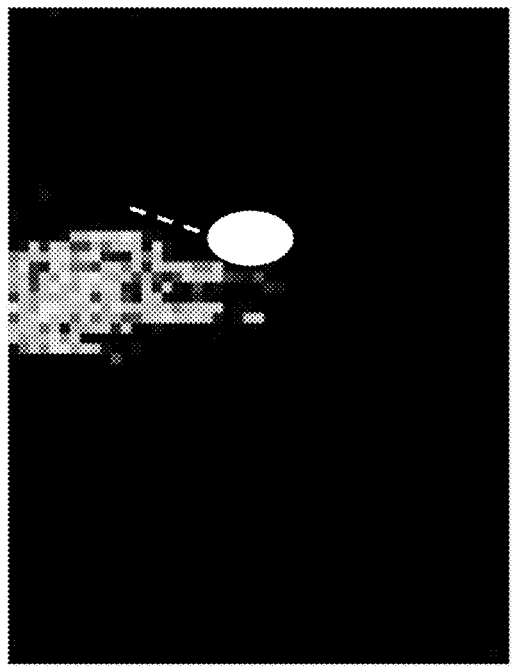
Figure 27:
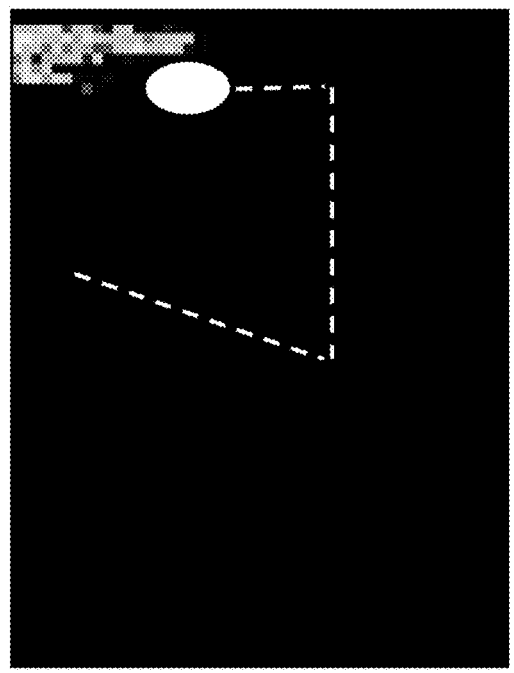

FIGS. 22-24 show a human subject on a bed in different positions. The mobile application can instruct the user to take different positions in the bed to provide the thermal imaging system with parameters that can be used to improve the capability of the thermal imaging system in detect human in bed with different positions.

Figure 14:
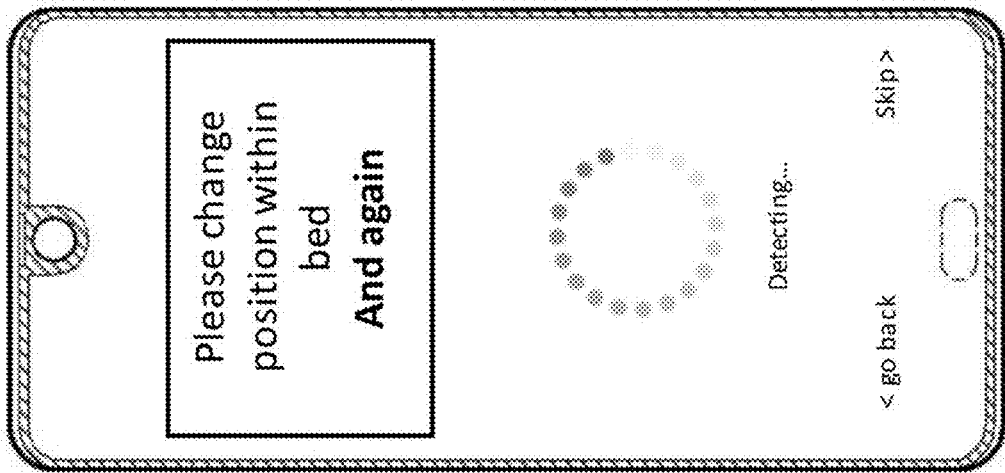
Figure 15:
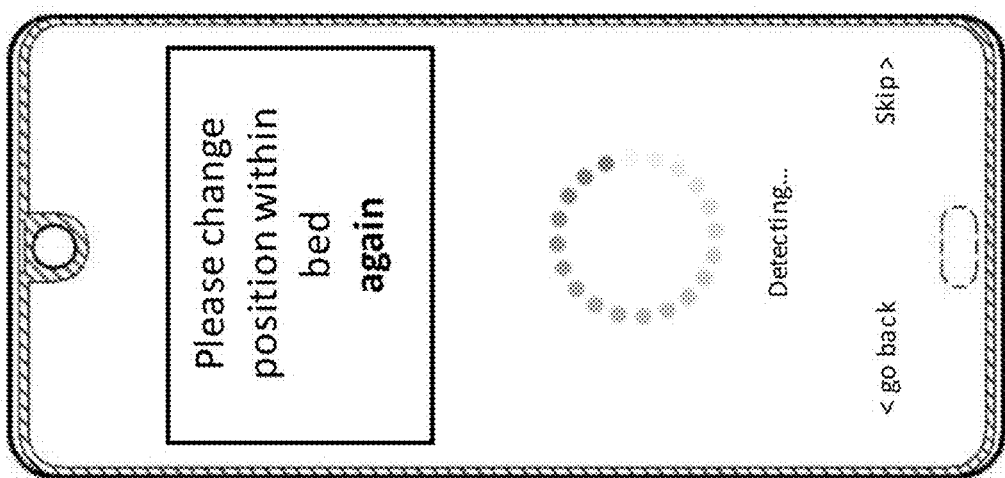
Figure 16:
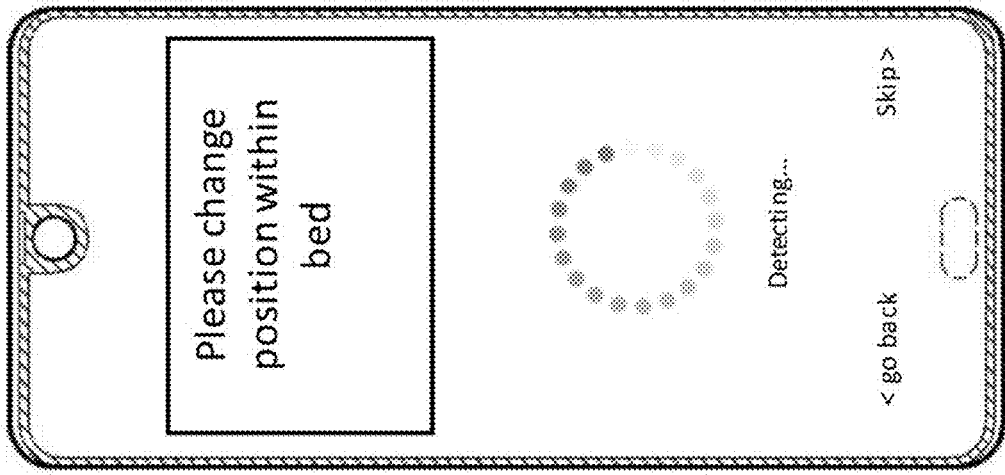

A set of user interfaces can guide the user to refine the detection capability of the thermal imaging system by using verification events that cover a variety of scenarios, as illustrated in FIGS. 14-16.

The user interfaces in FIGS. 14-16 instruct the user (103) to change positions once or multiple times for the validation/refinement of human in bed detection. The user can change positions in the bed in a way as illustrated in FIGS. 22-24. From the images illustrated in FIGS. 22-24 that are identified by the user (103) as showing human in bed, the server (115) collects different sets of estimations of the bed perimeter and the blob characteristics representing human in bed. Thus, the server can not only mark the associated positions as "in bed"/lying, but also can refine the location of the bed perimeter more precisely from combining the bed perimeters estimated from the different lying positions of the subject in the bed. The subject is not required to have technical skills or technical knowledge to train the thermal imaging system. By simply asking the subject to change position in the bed, the thermal imaging system can obtain a set of inputs to refine the parameters for event detection and/or classification. Thus, the user interface is very user friendly and effective in improving the performance of the thermal imaging system.

Figure 17:
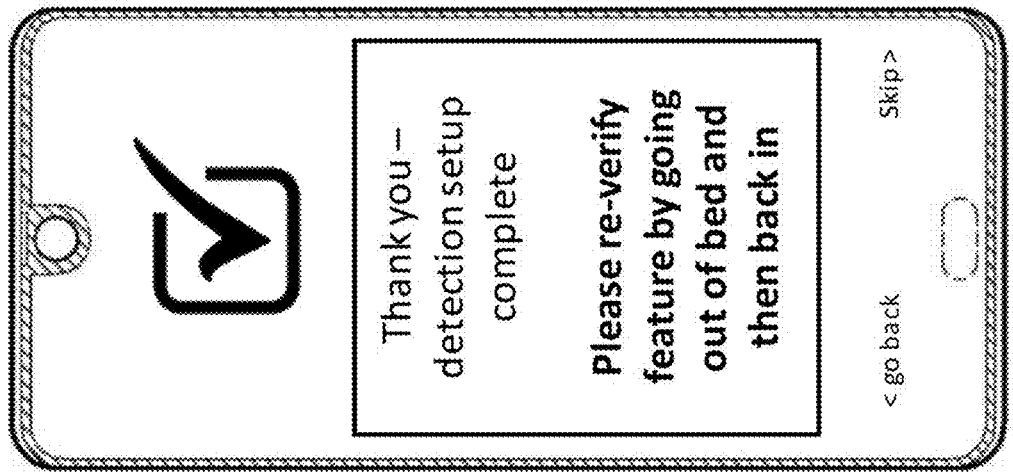

Upon human verification the user interface can instruct the subject to exit the bed and to re-verify placing a subject, him or herself back into bed, as illustrated in FIG. 17. With the modified/customized floor plan (125) and the improved image processing parameters (127), the thermal imaging system can detect the event correctly and show the detection result message "In bed detected", as illustrated in FIG. 9, during the re-verification process.

The refinement process illustrated in FIGS. 14-16 is particular helpful if there is a large offset in the detection results made using default settings (e.g., human identified as standing whilst lying in bed) or if a second verification run is unsuccessful (e.g., no in bed detected even though the user explicitly confirms that a human subject is actually in be). The refinement process allows the thermal imaging system to gain higher accuracy.

Figure 18:
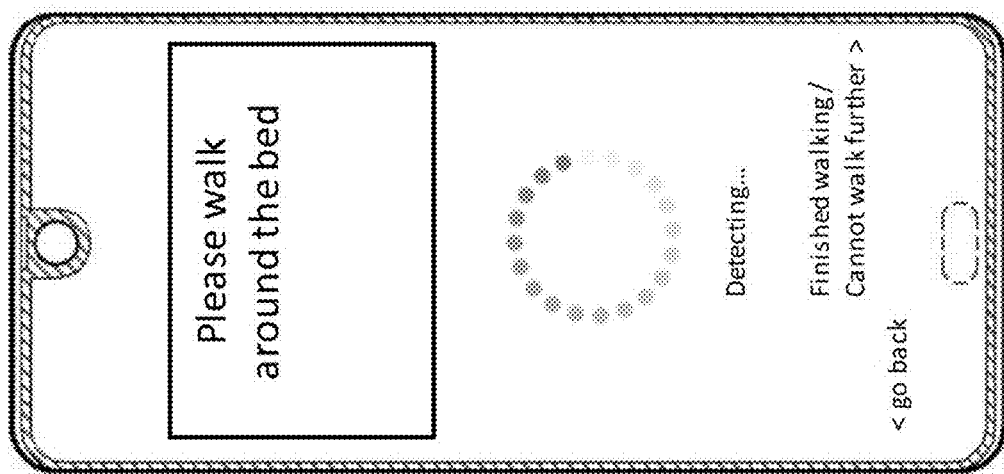
Figure 19:
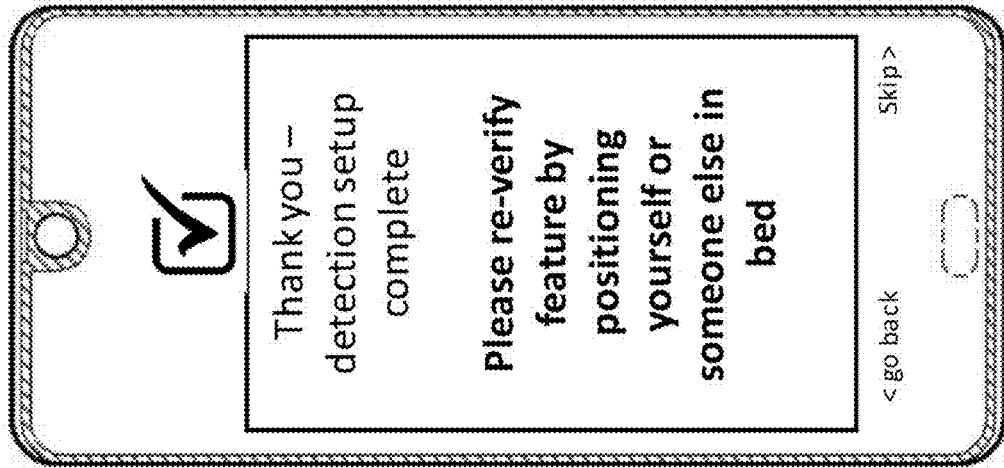
Figure 21:
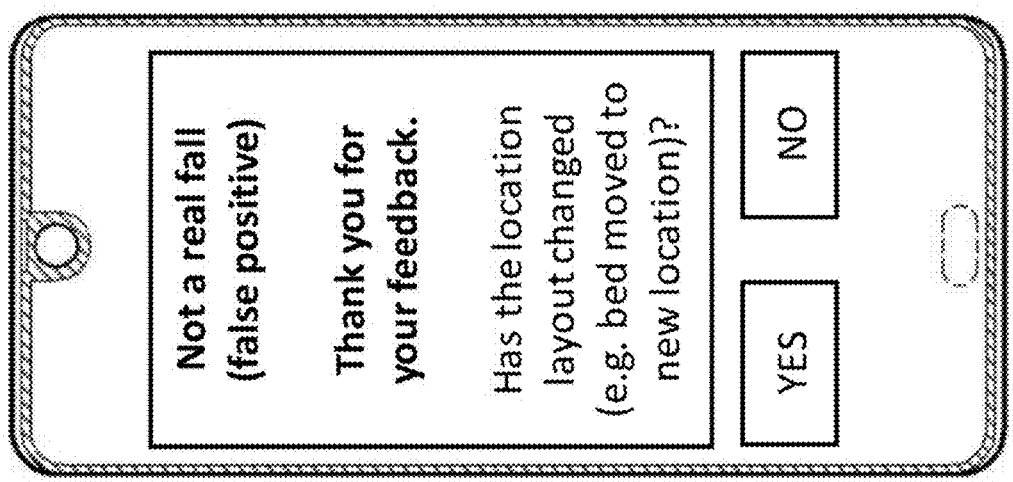

FIGS. 18-19 illustrate a set of user interface to instruct the user (103) to perform a sequence of activities to generate thermal inputs to refine the event detection capability of the thermal imaging system.

The user interface of FIG. 18 instructs the user to walk around the bed. As a result of the sequence of activities of walking around the bed, the thermal image system captures a set of thermal images as illustrated in FIGS. 25-28. Since the thermal images show a human walking around a bed, the server (115) can infer the perimeter of the bed from the moving blob of the user as captured in the thermal images.

In general, the system can instruct the user to position himself or herself in the vicinity of certain location features to annotate the location features, such as a bed, or a sofa or a table, or furniture, etc.

In case of the bed, the user can be instructed to walk around the bed to allow the thermal imaging system to estimate the perimeter of the bed. Further, the blobs of the user walking around the bed represent the user in a standing/vertical position. Comparing the characteristics of blobs of the user in a standing/vertical position and characteristics of blobs of users in a lying/horizontal position allows the server (115) to derive/refine parameters to classifying a blob orientation (e.g., standing/vertical, or lying/horizontal).

For example, from the thermal images of the user walking around the bed, the server (115) can mark and store the locations of the blob and identify occlusions of the blobs. The occlusions can be associated with the portions of the bed between the line of sight of the occluded portions of the user and the thermal imaging device (101). Further for each frame obtained of the user walking close or around the bed, the blob parameters can be stored as the image processing parameters (127); and the parameters can be references in determination whether a human is standing close to or next to the bed, or lying in the bed.

For example, the user interface of FIG. 18 can show a message "detecting . . . " until the user (103) finishes walking around the bed. Automatically, the server (115) draws a perimeter/geographical location marker next to the blob of the human in the thermal image, following the human. At the first turn of the human the server (115) can determine whether the initial line shall be to the left or right of human. As the human walks the perimeter of the bed, the server (115) marks the location. Once the user (103) has finished walking around the perimeter or walking partially around perimeter (e.g. if bed against wall, only one, two or three sides of bed can be walked along), the server (115) can detect the completion of the walk and provide the acknowledgment message illustrated in the user interface of FIG. 19. Optionally, the mobile application can show the thermal images as illustrated in FIGS. 25-28 while the user (103) walks around the bed.

In some instances, if the bed has only one side to walk along, the user can stop the process, by selecting the link "Finished walking". Partial perimeters can be automatically closed by the server (115) through a closing or estimation procedure (e.g., close a polyline).

In general, a verification flow of a detection feature of the thermal processing image can include: initiating a verification process, checking whether the verification is successful or not; if the verification is successful, annotating parameters (e.g. default parameters as correct) and provide a verification/confirmation message to the user; and if the verification is not successful, prompting human interaction, where a human user (103) can manually annotate the event/feature, or provide thermal inputs to refine the accuracy of the feature. The verification flow can be repeated until the verification is successful.

For example, the user can be instructed to walk out of the room for "out of room detection". In such an event, a human blob disappears out of the scenery captured by the thermal image of the imaging device (101). If a human is detected inside the room, whilst in reality the human is outside of the room, which can be possible as a result of the default image processing parameters causing the server (115) to mistakenly identify a static hot spot as a blob of a human. For example, the human heat residue ("heat shadow") from sitting on a couch or bed may lead to the thermal imaging system to incorrectly conclude that a human is on the couch or bed. In such a situation, the user interface provided on the mobile device (103) can instruct the user (103) to confirm that he or she is outside of the room (e.g., environment (107)) and no one is in the room. The user confirmation allows the server (115) to mark the hot-blobs in the room as "non-human" or "static", to better differentiate between human and static hot blobs. Further, in case of a "heat shadow", the server (115) can stored the location of the heat blob "separating" from a human blob and mark these locations of zones where body heat can be transferred to objects and to denote these heat signatures as non-human, even though they may have human shape, size, orientation and heat signature for a limited amount of time. Further, if there shall still be an undefined state detected by the server (115), such as a "non-human hotspot" being identified as human by the server (115) while the user confirms no one in the room, the server (115) can further instruct user, as in the second refinement procedure described above, for the user to walk to the entrance/exit door, and possibly walk into the room/scenery, until the user is detected by thermal imaging device (101) and then the server (115) can mark a certain location and scenario as entrance/exit.

For example, the user can be instructed to lay on the floor to verify a "fall detection" feature. Such a feature can be very useful for aged care. The user interface on the mobile device (105) can indicate detection status on a person lying on the floor, and if no detection is indicated then the user would be instructed to verify through interaction. Fall detection may be more complex than in bed detection or out of room detection, as a) there are a vast amount of positions and locations where a fall can occur within the field of view of the thermal imaging device (101), b) a fall could be partially or fully occluded by objects in the room making the fall hard to detect, and c) the fall could occur in areas where there is no line of sight and field of view of the thermal imaging device (101), hence undetectable. Therefore, fall detection may be harder to achieve the same level of accuracy for other detection features offered by the thermal imaging system. On the other hand, instructing the user to simulate all possible fall scenarios, positions and locations would be not user friendly. Therefore, the thermal imaging system may use its default settings for the commencements of its operation, which can provide false positives and indicate falls, even if the outcome is not identified (meta-state, unknown state between e.g. fall and standing). False positives are alarms or notifications of fall detection, where a fall is identified by the thermal imaging system but, in reality, may not have been a fall.

Figure 30:
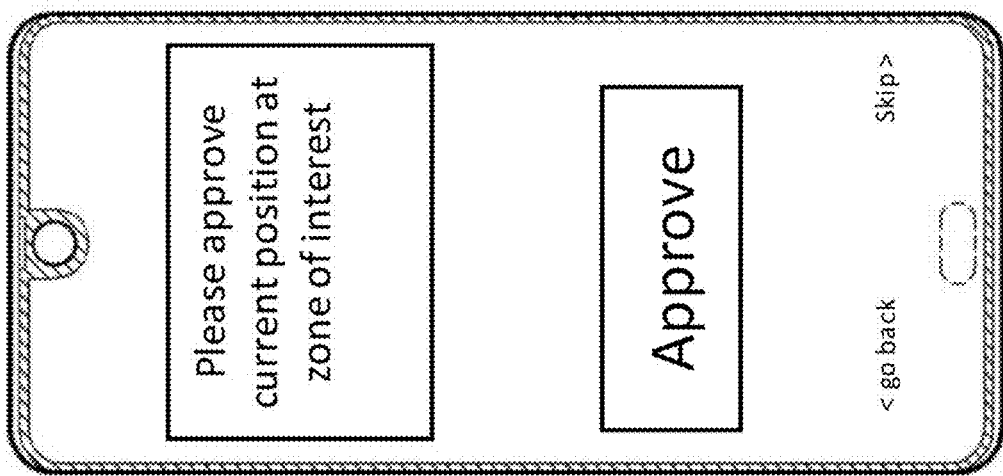
FIGS. 29-35 illustrate user interfaces and processes to identify a location zone in a floor plan used by the thermal imaging system according to one embodiment.
Figure 29:
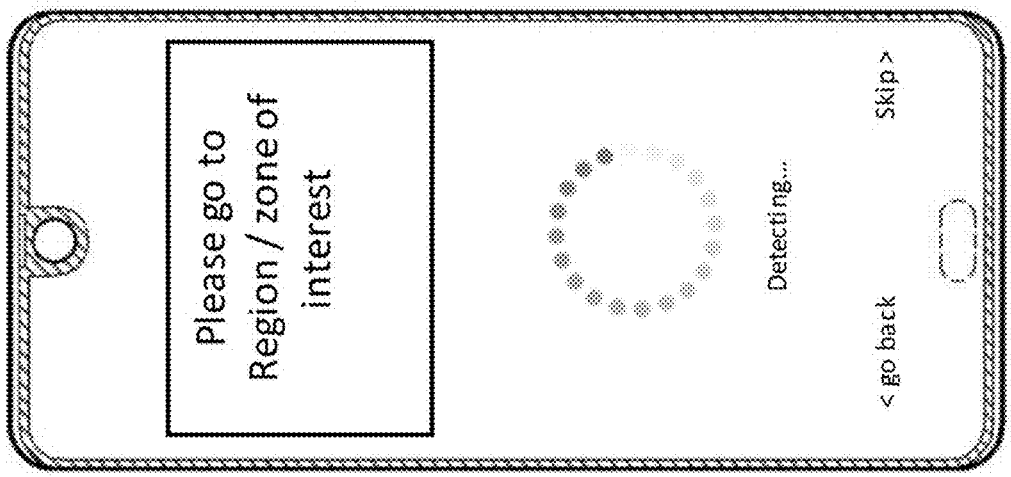
Figure 32:
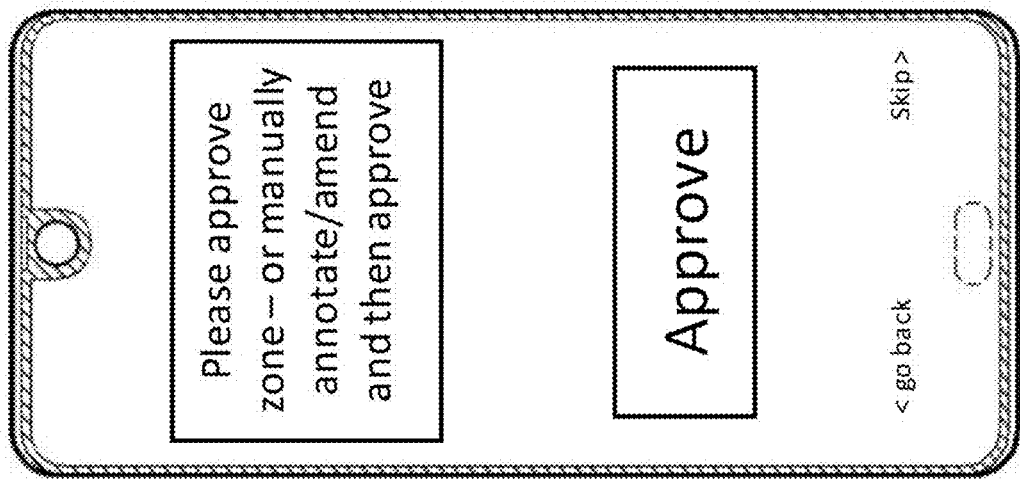
Figure 31:
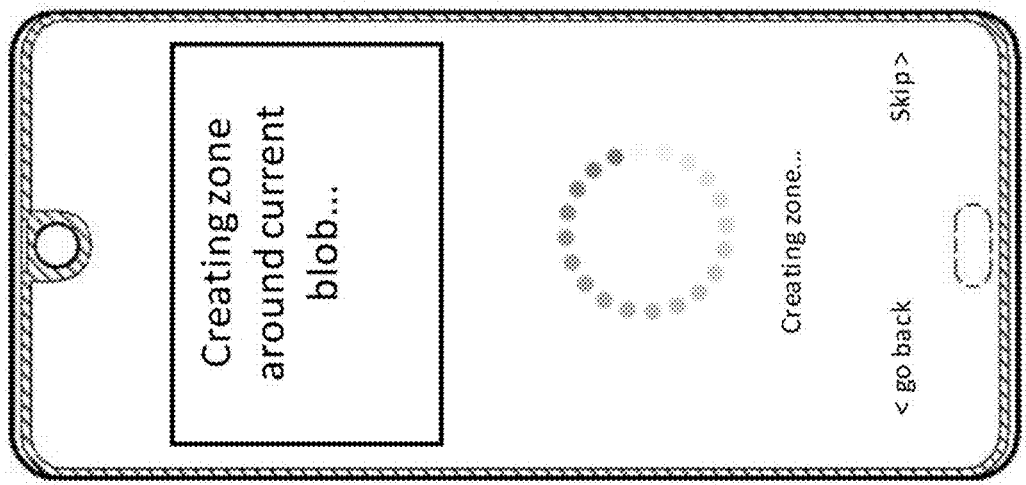
Figure 33:
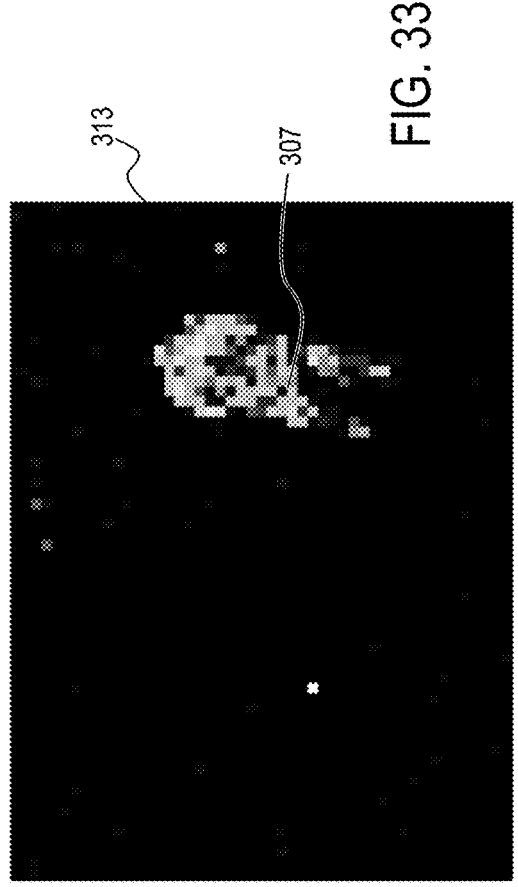
Figure 35:
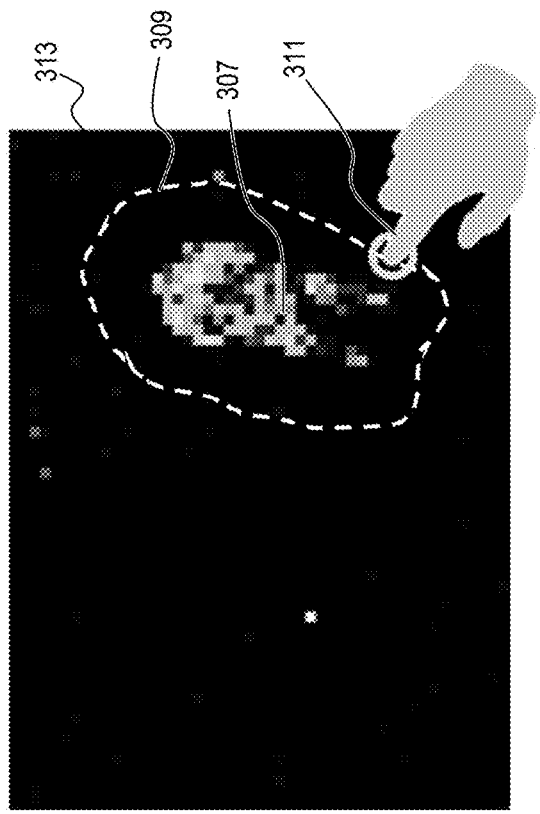
Figure 34:
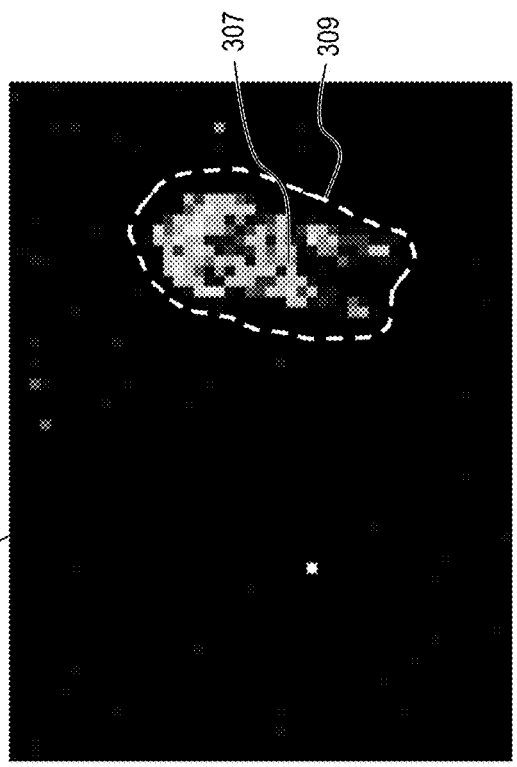

For example, the user can be instructed to go to a particular region or zone of interest using a user interface illustrated in FIG. 29. A user interface illustrated in FIG. 30 contains an "Approve" button, which can be activated by the user once the user is in the particular region or zone of interest. When the "Approve" button is activated, the thermal imaging device (101) identifies the blob of the image (307) of the user within the thermal image (313) of the environment (107) (e.g., as illustrated in FIG. 33 and captured by the thermal imaging device (101)) and uses the image (307) of the user to generate an estimated size and location of the zone. For example, a user interface illustrated in FIG. 31 starts a process of identifying the size, location and/or shape of the zone (e.g., a bed, an activity area, a hall way, a dining area). The boundary (309) of the image (307) of the user as illustrated in FIG. 34 can be used as an initial estimate of the boundary of the zone. The estimation can be presented in a user interface as illustrated in FIG. 35 to allow the user to adjust the estimation. For example, the user may use a finger (311) to touch and select the estimated boundary on a touch screening showing the thermal image (313) of the environment (107), causing the thermal imaging system to adjust the location and size of the estimated boundary. For example, the estimated boundary (309) can be dragged over the image (313) to adjust its location. For example, the estimated boundary (309) can be scaled to increase or reduce its size. In some instances, the finger (311) may draw a shape (309) around the image (307) of the user presented on a touch screen to specify the boundary of the zone. Alternatively, or in combination, the user may use his/her image (307) as a paint brush tool to paint the zone in the thermal image of the environment (107), by moving around in the zone while the user interface of FIG. 31 is displaced; and the area in the image (313) painted using the paint brush tool identifies the shape and location of the zone. A user interface of FIG. 33 has an "Approve" button that can be activated to confirm the user acceptance of the location, shape and/or size of the boundary (309) of the zone as presented with the thermal image (313) of the environment (107).

User annotations to identify location features can be generated not only based on the thermal image (307) of the user extracted from the thermal image (313) of the environment (107) captured by the thermal imaging device (101), but also the thermal images of other objects. The thermal imaging system of FIG. 1 can identify and/or extract hot and/or cold objects that have temperatures different from the background temperature of the environment (107). Examples of such objects include modems, computers, television sets (TVs), refrigerators, stoves, and appliances. The thermal imaging device (101) can identify the blobs of thermal images of the objects within the thermal image (313) of the environment (107) and requests the user to annotate or classify the objects. For example, a user interface may highlight a thermal image blob extracted from the thermal image of the environment (107) and present a pull-down menu that allows the user to select a characterization/identification of the object. When the thermal image blob matches a predetermined, distinct heat signature of a type of objects (e.g., modems), the thermal imaging system of FIG. 1 can automatically annotate the object with or without user confirmation. Some objects are cold or hot spots, such as windows, doors, sinks, and objects of different emissivity or temperature from the overall background temperature of the environment (107).

Sun irradiation can create a hot spot in the environment (107). This hot spot could be interpreted as a human as it may move very slowly and could have human like shape in a low resolution thermal image. Optionally, this hot spot created by sun irradiation can be annotated by the user. Alternatively or in combination, the thermal imaging system of FIG. 1 can use weather data of the geographical area of the environment (107) to determine whether the host spot is a result of sun irradiation. For example, the travel path of the sun hot spot relative to the orientation of the room and the location of the thermal imaging device (101) can be calculated to determine whether there is a match between the calculated path the observed location/path of the hot spot. The degree of matching can be used to determine whether the hot spot is a result of sun irradiation. A compass sensor in the mobile device (105) during setup can be used to identify the relative orientation of the scenery relative to the direction of north and thus facilitate the identification of hot spots generated by sun irradiation.

Weather data can be used to determine whether an air conditioner (AC) or a heater is likely being operated in the environment (107) and thus seen in the thermal image (313) of the environment (107). For example, if a heater is detected in thermal imaging system of FIG. 1 while the outside air temperature is in a range that typically causes the use of heaters, it can be determined that the presence of the operating heater is nothing out of the ordinary. On the contrary, if outside air temperature is hot (e.g., 100-degree Fahrenheit) and the heater is operating inside the room to increase the background temperature in the room, the thermal imaging system of FIG. 1 can send a notification or alert to the user (103) and/or other recipients specified in the user account (121). Weather data can be useful in determining whether the background temperature of the environment (107) is within a standard range suitable for normal living. An alert or notification can be generated when the background temperature of the environment (107) is outside of the range.

The thermal imaging device (101) can optionally include other sensors, such as time of flight sensors, microphone, lidar, etc. For example, the microphone and a speaker in the thermal imaging device (101) can be used to facilitate communications between a human administrator (or a computerized administrator) and a person in the environment (107) in resolving false alarms and/or generating user annotations. For example, when the environment (107) is monitored for elder/patient care, the thermal images captured by the thermal imaging device (101) can be analyzed to detect a possible abnormal situation/emergency, such as a fall. A nurse can be notified of the situation to initiate a communication and/or obtain a feedback from the patient/resident. Using a communication link to the thermal imaging device (101), the nurse can operate a mobile applicating running in a mobile device to check and engage with person using voice, asking them if they are ok? If the person responds: "I am ok", the situation can be annotated and/or used to adjust subsequent responses for a similar subsequent detection. In some instances, a computerized the attendant can initiate a similar voice communication through text to speech synthesizer. The voice response from the person (patient/resident) can be analyzed automatically using a voice recognition technique to determine a response. In some instances, an artificial intelligence system can be implemented in the server (115) to process the voice response from the person in the environment and/or formulate a response, such as canceling a false alarm, annotating a false alarm, calling a nurse and/or another registered person for assistance, etc. Valuable time can be saved when the nurse doesn't need to run down to the room every time there is a fall detection alarm. In some instances, the voice interface can be implemented using a separate device connected to the server (115). For example, the separate device can be a mobile device (105), a smart speaker, a smart television set, a smart home hub/controller, etc. that receives voice input from the person in the environment (107) and provides voice response to the person.

The mobile device (105) can provide a user interface that allows the user (103) to annotate a fall detection notification. For example, if the server (115) identifies a fall and generates a notification and the user (103) determines that there is actually no fall, the notification is a false positive; and the user interface of the mobile device (105) allows the user (103) to provide a feedback rating the notification as a false positive, which causes the server (115) to annotate the event (and/or the parameters of the thermal blob that causes the false notification).

Figure 39:
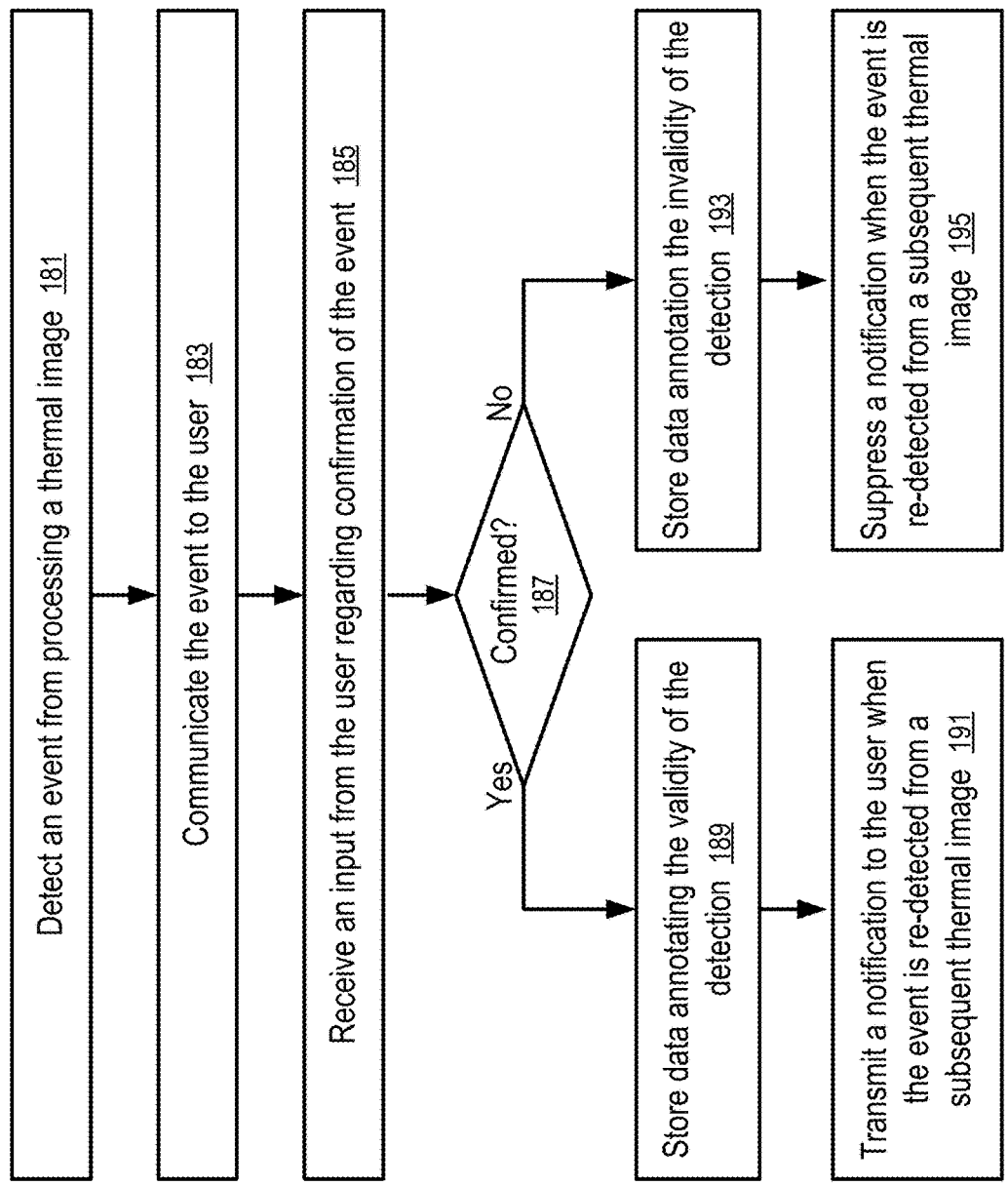
FIG. 39 shows a method to configure a thermal imaging system based on user feedback on notifications of detected events according to one embodiment.

FIG. 39 shows a method to configure a thermal imaging system of FIG. 1 based on user feedback on notifications of detected events according to one embodiment.

At block 181, the thermal imaging system detects an event from processing a thermal image captured by a thermal imaging device (101) mounted to monitor the environment (107).

At block 183, the server (115) of the thermal imaging system communicates the event to the user (103) through a notification to a mobile device (105). A user interface illustrated in FIG. 20 presents the notification and allows the user (103) to provide feedback about the accuracy of the notification and/or the detection of the event.

For example, when the server (115) extracts a human blob having a shape, location, size that cannot be classified as a known non-fall position, such as standing, the server (115) can classify the event as "human falling" and generate a "fall detected" notification message to the mobile device (105) registered in the user account (121).

Alternatively, or in combination, the notification can be sent to another device (e.g., siren, speaker, etc.) or to another configured user.

Figure 20:
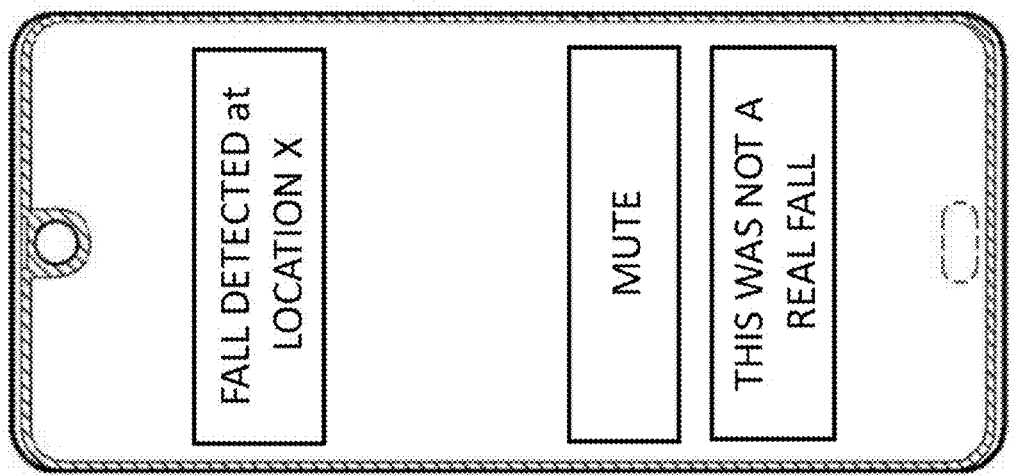

A mobile application in the mobile device (103) can provide the user interface as illustrated in FIG. 20 to receive user input on the accuracy feedback on the notification. Alternatively, or in combination, a website of the server (115) can be used to provide a user interface to receive the user feedback.

At block 185, the server (115) receives an input from the user (103) regarding confirmation of the event reported by the notification.

At block 187, the server (115) determines whether the input confirms the occurrence of the event, or identifies the notification as false positive.

At block 189, if the user input confirms the occurrence of the event as reported by the notification, the server (115) stores data annotating the validity of the detection; and subsequently, at block 191, the server (115) can transmit a notification to the user (103) when the event is re-detected from a subsequent thermal image.

At block 193, if the user input identifies the notification as false positive, the server (115) stores data annotating the invalidity of the detection; and subsequently, at block 195, the server (115) can suppress a notification to the user (103) when the event is re-detected from a subsequent thermal image.

For example, the user interface of FIG. 20 has a button "Mute" that can be selected to acknowledge the notification, and a button "This was not a real fall" that can be selected to indicate to the server (115) that the alarm/notification is "false positive".

For example, in response to the user selecting the button "This was not a real fall", the shape, features, location and/or other parameters associated with the human blob that triggers the notification can be identified as not associated with fall, such that a future detection of a human blob having a same or similar shape, features, location and/or other parameters can be classified as "not-falling".

For example, in response to the user selecting the button "Mute" without selecting the button "This was not a real fall", the server (115) can annotate the shape, features, location and/or other parameters associated with the human blob that triggers the notification as being associated with "real fall".

The annotated parameters can improve the accuracy of the server (115) in classifying the events detected in the thermal image from the imaging device (101).

The server (115) can improve its accuracy in event classification by progressing the parameters associated with the annotated event notifications.

For example, if a blob of a certain shape is marked as a "real fall", slight aberrations/variation/deviations of its parameters can also be marked for future reference as falls as well.

In some instances, the server (115) can detect a human blob in a fall position and subsequently determines that the human blob starts moving (e.g., walking out of the door). Such a situation generally does not correspond to a fall of an elder or patient that results in an emergency. Thus, the server (115) can adjust its notification policy such that if such a human blob posture occurs in future, the server (115) can delay the transmission of the notification/alarm and wait for next action of the human blob to determine whether the fall is an emergency.

Fall detection can be also improved by taking certain locations and regions of the scenery into account. For example, a fall next to a bed can be more likely than in the middle of the room. Therefore, the detection of the bed can be helpful for identifying falls in vicinity of the bed.

In some implementations, when a human blob becomes partly occluded by an object, the server (115) cannot, by default, assign a definite state to the human represented by the blob. In such a situation, the server (115) can identify the human blob as in a meta-state or unknown state. To implement a conservative notification policy, the server (115) can send a fall indication, which allows a user to annotate the detection using the user interface illustrated in FIG. 20. The user feedback assists the server (115) in classifying the state of the human represented by the blob and to improve the floor plan 127 (e.g. occlusion refinement or new objects which create occlusion).

In some implementations, when a human blob can be classified to be in multiple states. To implement a conservative notification policy, the server (115) can send for example a fall indication, which allows a user to annotate the detection using the user interface illustrated in FIG. 20. The user feedback assists the server (115) in classifying the state of the human represented by the blob. Further, the thermal imaging system can send notifications to users to help improve unknown states.

In some implementations, when a false positive is identified where a subject is partially occluded, the user interface provides an option to add information about the occlusion. For example, the user interface illustrated in FIG. 21 can provide the message: "Not a real fall (false positive) Thank you for your feedback. Has the location layout changed (e.g., bed moved to new location)?". The button "Yes" and the button "No" in FIG. 21 can be used by the user to indicate whether the layout has been changed.

In some instances, the message from the server (115) can state that: "The alert is given because the subject was (partially) occluded. Could you provide information about the object of occlusion?". The user interface is then configured to allow the user (103) to make a binary choice for either "Yes" or "No".

If the user indicates a location layout has been made in the environment, a dropdown list, for example, can be presented with typical items such as sofa, bed, cabinet, chair, table, etc. to identify the item that is involved in the layout change; and the user (103) has an option to manually name an item for the layout, if the item is not found in the default list. The user interface can receive information about location and size (e.g., 2-meter-tall cabinet left of bed, approx. 1-meter wide). Such information can be stored in the floor plan (125) and used in the event detection computation/classification (e.g., occlusion processing). Further, the user may input the information to the mobile device (105) via voice command and the mobile application running in the mobile device (105) can use speech recognition to obtain and extract relevant information. The user can for example say "bed has been moved 2 meters from previous position and a new drawer has been added left of bed"; and in response, the mobile application extract the information and annotate it in the parameters (127).

In general, the discussed above feedback mechanism can be used with any detection/notification feature of the thermal imaging system. For example, the thermal imaging system can implement a hazardous hotspot detection feature. When a hotspot is detected by the thermal imaging system, the server (115) can generate a "hazardous hotspot detected" notification/alarm. The user interface implemented in the mobile device (105) can receive user feedback as to whether the detected hot spot is "good" or "bad". A "good" hotspot object can occur in the day to day life in the environment, such as a stove, hot plate, microwave, etc. The temperature of the "hotspot" object can exceed a safety temperature range for a human (e.g., a temperature above 50 degrees Celsius can cause burns). A "bad" hotspot can be an actual threat and action from the user would be required to eliminate it.

If the user (103) classifies a hotspot as "good", a re-occurrence of the hotspot with its exact same or similar parameters (shape, size, location, temperature profile) can be classified as non-hazardous; and thus, the server (115) can suppress a "hazardous hotspot detected" notification/alarm in response to the re-occurrence.

If the user (103) classifies the hotspot as "bad", the re-occurrence of the hotspot and/or similar occurrences can be classified as hazardous and thus can trigger the "hazardous hotspot detected" notification/alarm.

In one scenario, a bed in the environment (107) has been moved, which can occur in facilities hosting patients and/or elders. A resident lying in the bed at a different position, which has been previously verified, could trigger a fall detection alarm. The user (103) (e.g., nurse) could then provide feedback (e.g., using the user interfaces of FIGS. 20 and 21) to identify the false positive and provide information to adjust the floor plan (125) and thus prevent further false positive notifications.

The human annotations of features and events can be stored in the server (115). The server (115) can apply sophisticated computation techniques to improve its detection and/or classification capabilities. For example, the human annotations identify the desirable classification results; and thus, a supervised machine learning technique can be applied to train an Artificial Neural Network (ANN) to perform event classifications. For example, the annotations from different user accounts can be aggregated to train a general ANN model for event classification for a set of user accounts. The general ANN model can be used as a default model for a user account (121); and the annotations in the particular user account (121) can be used to further train the ANN model to generate a customized ANN model for the environment (107). Further new firmware updates on the server can be implemented with more trained, more accurate ANN models.

The present disclosure includes the methods discussed above, computing apparatuses configured to perform methods, and computer storage media storing instructions which when executed on the computing apparatuses causes the computing apparatuses to perform the methods.

In FIG. 1, each of the mobile device (105), the server (115), and the thermal imaging device (101) can be implemented at least in part in the form of one or more data processing systems, with more or fewer components.

Figure 40:
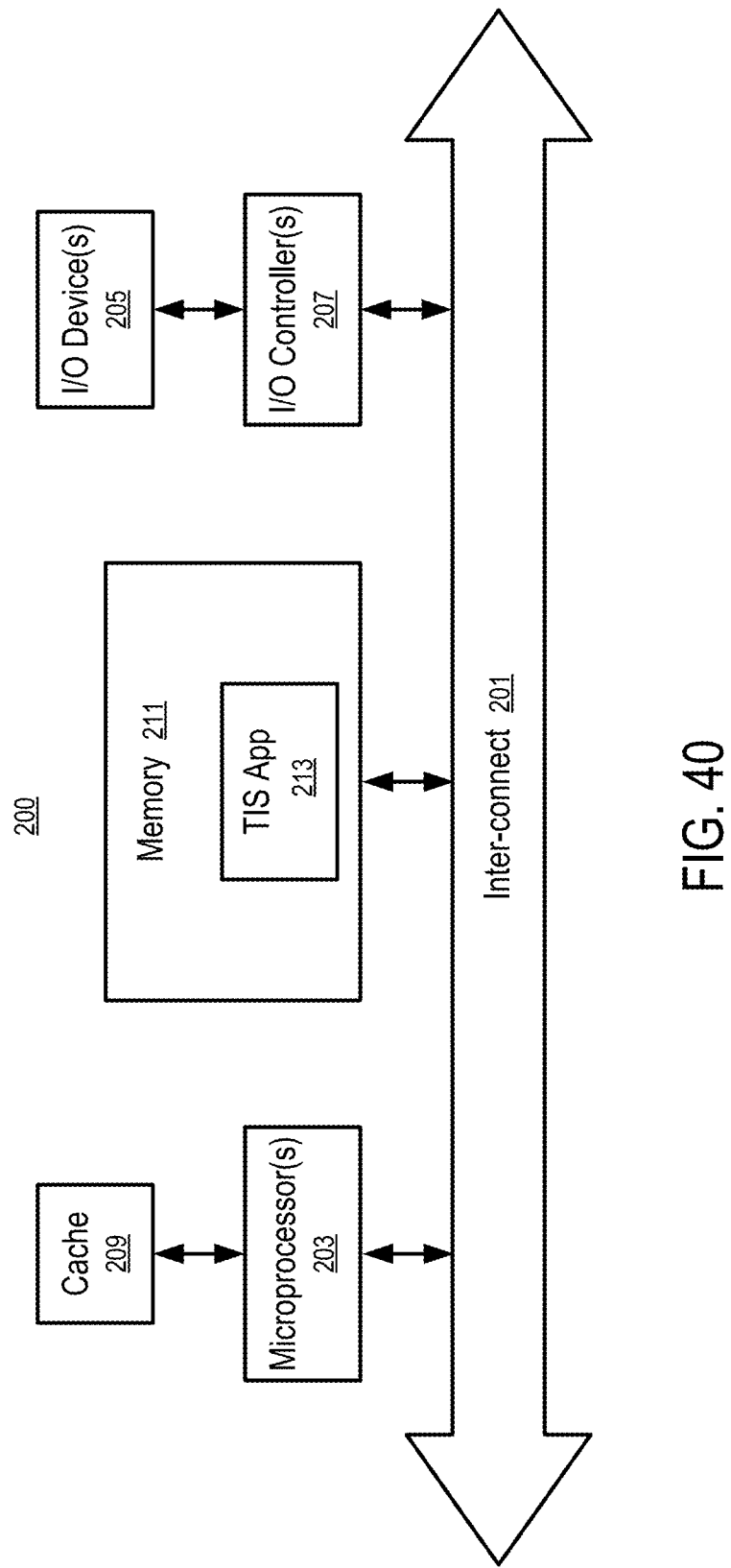
FIG. 40 shows a data processing system that includes at least a portion of the thermal imaging system according to one embodiment.

FIG. 40 shows a data processing system that includes at least a portion of the thermal imaging system according to one embodiment.

FIG. 40 shows a data processing system that can be used to implement some components of embodiments of the present application. While FIG. 40 illustrates various components of a computer system, it is not intended to represent any particular architecture or manner of interconnecting the components. Other systems that have fewer or more components than those shown in FIG. 40 can also be used.

In FIG. 40, the data processing system (200) includes an inter-connect (201) (e.g., bus and system core logic), which interconnects a microprocessor(s) (203) and memory (211). The microprocessor (203) is coupled to cache memory (209) in the example of FIG. 40.

In FIG. 40, the inter-connect (201) interconnects the microprocessor(s) (203) and the memory (211) together and also interconnects them to input/output (I/O) device(s) (205) via I/O controller(s) (207). I/O devices (205) may include a display device and/or peripheral devices, such as mice, keyboards, modems, network interfaces, printers, scanners, video cameras and other devices known in the art. When the data processing system is a server system, some of the I/O devices (205), such as printers, scanners, mice, and/or keyboards, are optional.

In FIG. 40, the memory (211) stores a thermal imaging system (TIS) application (213). For example, the TIS application (213) can be a mobile application implemented in the mobile device (105). For example, the TIS application (213) can be a set of instructions implementing the image processor (129) of the server (115). In some instances, the functions of the TIS application is implemented at least in part via logic circuits, such as Application-Specific Integrated Circuit (ASIC) or Field-Programmable Gate Array (FPGA).

The inter-connect (201) includes one or more buses connected to one another through various bridges, controllers and/or adapters. For example, the I/O controllers (207) include a USB (Universal Serial Bus) adapter for controlling USB peripherals, and/or an IEEE-1394 bus adapter for controlling IEEE-1394 peripherals.

The memory (211) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a server configured to:
receive at least one thermal image of an environment,
classify one or more objects in the thermal image using an image processor,
transmit a notification based on the classifying,
adjust a setting of the image processor in response to user feedback associated with the notification, and
provide services based on the thermal image;
a thermal imaging device mounted in the environment configured to capture the thermal image; and
a mobile device configured to:
receive the notification,
receive the user feedback regarding the notification via a user interface, and
transmit the user feedback to the server.

2. The system of claim 1, wherein the mobile device is configured to present a notification of a detected event in the environment and to receive user feedback on the notification.

3. The system of claim 1, wherein the thermal imaging device is configured to transmit the thermal image to the server.

4. The system of claim 1, wherein the mobile device is configured to transmit the thermal image to the server.

5. The system of claim 1, wherein the mobile device is configured to pre-process the thermal image prior to transmitting the thermal images to the server.

6. The system of claim 1, wherein classifying the one or more objects in the thermal image comprises identifying a human in the thermal image.

7. The system of claim 6, wherein the server further classifies a pose of the human.

8. The system of claim 7, wherein the server further infers an activity in the image based on the pose and a floor plan of the environment.

9. The system of claim 8, wherein the server generates the floor plan based on one or more reference photographs captured by the mobile device.

10. The system of claim 1, the image processor comprising an artificial neural network.

11. A non-transitory computer-readable storage medium for tangibly storing computer program instructions capable of being executed by a computer processor, the computer program instructions defining the steps of:
receiving at least one thermal image of an environment;
classifying one or more objects in the thermal image using an image processor;
transmitting a notification to a mobile device based on the classifying;
receiving user feedback on the thermal image from the mobile device;

adjusting a setting of the image processor in response to the user feedback associated with the notification; and providing services based on the thermal image.

12. The computer-readable storage medium of claim 11, wherein classifying the one or more objects in the thermal image comprises identifying a human in the thermal image.

13. The computer-readable storage medium of claim 12, wherein the classifying further comprises classifying a pose of the human.

14. The computer-readable storage medium of claim 13, wherein the steps further comprise inferring an activity in the image based on the pose and a floor plan of the environment.

15. The computer-readable storage medium of claim 14, wherein the steps further comprise generating the floor plan based on one or more reference photographs captured by the mobile device.

16. A method comprising:

receiving, at a server, at least one thermal image of an environment;

classifying, by the server, one or more objects in the thermal image using an image processor;

transmitting, by the server, a notification to a mobile device based on the classifying;

receiving, at the server, user feedback on the thermal image from the mobile device;

adjusting, by the server, a setting of the image processor in response to the user feedback associated with the notification; and providing services based on the thermal image.

17. The method of claim 16, wherein classifying the one or more objects in the thermal image comprises identifying a human in the thermal image.

18. The method of claim 17, wherein the classifying further comprises classifying a pose of the human.

19. The method of claim 18, further comprising inferring an activity in the image based on the pose and a floor plan of the environment.

\* \* \* \* \*